(12) United States Patent
Arita et al.

(10) Patent No.: US 6,359,706 B1
(45) Date of Patent: Mar. 19, 2002

(54) IMAGE READING APPARATUS

(75) Inventors: Shinichi Arita, Tokyo; Kazuyuki Kondo; Hidekage Sato, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/996,314

(22) Filed: Dec. 22, 1997

(30) Foreign Application Priority Data

Dec. 26, 1996  (JP) ............................................. 8-347641

(51) Int. Cl.⁷ ................................................. H04N 1/04
(52) U.S. Cl. ....................................... 358/486; 358/506
(58) Field of Search ................................ 358/461, 487, 358/506, 486

(56) References Cited

U.S. PATENT DOCUMENTS

| | | | |
|---|---|---|---|
| 3,800,078 A | | 3/1974 | Cochran et al. ............. 178/7.1 |
| 4,734,783 A | | 3/1988 | Horikawa ................... 358/280 |
| 4,914,294 A | * | 4/1990 | Fukai et al. ............. 250/327.2 |
| 4,991,030 A | | 2/1991 | Sato et al. .................. 358/474 |
| 5,371,614 A | * | 12/1994 | Ito .............................. 358/487 |
| 5,687,008 A | * | 11/1997 | Morika Wa et al. ........ 358/475 |
| 5,717,790 A | * | 2/1998 | Kanesaka et al. ........... 358/461 |
| 5,719,970 A | * | 2/1998 | Aoki .......................... 382/313 |
| 5,751,451 A | * | 5/1998 | Ogoshi et al. .............. 358/487 |
| 5,757,515 A | * | 5/1998 | Okada ........................ 358/461 |
| 5,768,444 A | * | 6/1998 | Nishimura .................. 382/298 |
| 5,969,800 A | * | 10/1999 | Makinouchi ................. 355/53 |
| 5,973,713 A | * | 10/1999 | Kuwabara ................... 347/194 |
| 6,108,462 A | * | 8/2000 | Aoki .......................... 382/313 |

FOREIGN PATENT DOCUMENTS

| | | |
|---|---|---|
| EP | 0267805 | 5/1988 |
| EP | 0527610 | 2/1993 |

* cited by examiner

*Primary Examiner*—Jerome Grant, II
(74) *Attorney, Agent, or Firm*—Fitzpatrick, Cella, Harper & Scinto

(57) ABSTRACT

The invention discloses an image reading apparatus in which a linear image sensor is provided in the vicinity of an imaging optical system and the main scanning operation is achieved by electronic scanning of the linear image sensor in the longitudinal direction thereof while the sub scanning operation is achieved by the relative movement of the linear image sensor and the image formed by the imaging optical system with plural scanning speed and the image information is outputted by communication between the image process means for processing the image obtained by each main scanning operation and the external equipment, the apparatus is featured by fetching plural shading data while a scanning motor in the sub scanning direction is driven with such plural scanning speeds.

14 Claims, 22 Drawing Sheets

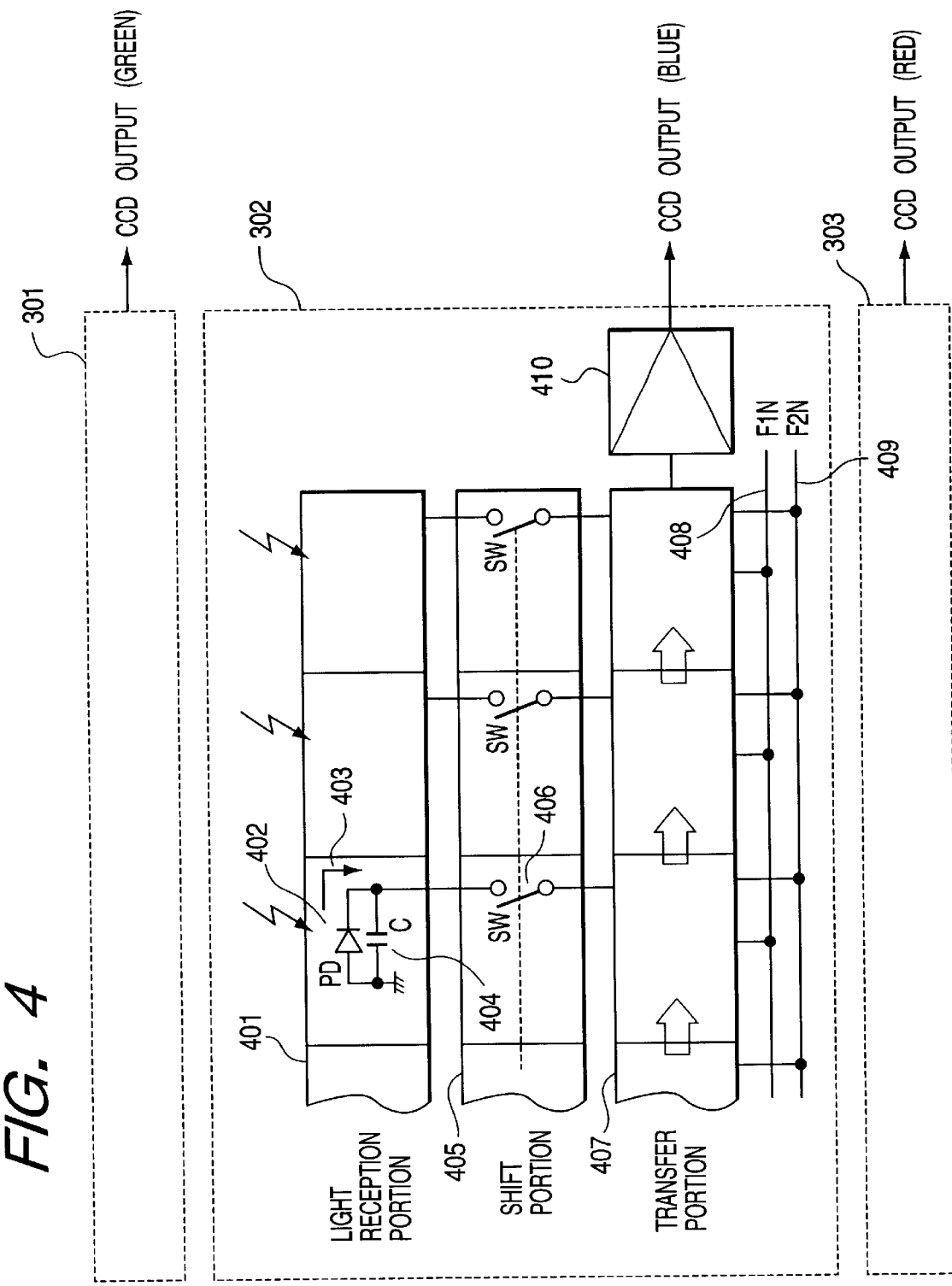

IMAGE READING APPARATUS

BACKGROUND OF THE INVENTION

1. Field of the Invention

The present invention relates to an image reading apparatus, and more particularly to an image reading apparatus capable of reading shading data.

2. Related Background Art

A film scanner for inputting the image of a film into a personal computer is so constructed that in the image reading operation, first scan the image with a low resolution and a high speed (pre-scan) is performed to thereby display the entire image on the personal computer, and then the main scanning operation in a desired range designated on the preview image is performed to thereby send the obtained image data to the personal computer.

The configuration of such film scanner will be explained in the following with reference to FIG. 28, in which shown are an illuminating light source 2801; a film holder 2802 for supporting a film constituting a translucent original and capable of transporting the thin translucent film, supported on the plane of the drawing (Y-Z plane), in a direction Y; an imaging lens system 2803; and a CCD linear image sensor 2804 (hereinafter simply called linear image sensor). The linear image sensor 2804 is positioned that its longitudinal direction is along a Z-direction in the plane of the drawing. By such arrangement, the main scanning direction, which is the longitudinal direction of the linear image sensor 2804, becomes perpendicular to the moving direction of the film holder 2802. In reading the color image on the film, there can be conceived following variations in the combination of the light source 2801 and the linear image sensor 2804:

| Light source | CCD | Image reading |
| --- | --- | --- |
| (1) White | three lines | R,G,B simultaneous reading |
| (2) Three colors (B,G,R) | one line | R,G,B time-shared reading |
| (3) While +B,G,R filters | one line | R,G,B time-shared reading |

These methods have respective advantages and disadvantages. In the following description, there will be assumed the combination (1).

In FIG. 28, there are shown an analog image processing circuit 2805 for gain setting and clamping of an analog image signal output from the linear image sensor 2804; an A/D converter 2806 for converting the analog signal into a digital signal; a digital image processing circuit 2807 for effecting image processing and CCD drive pulse removal; an image processing circuit 2807 composed of a gate array and capable of various high-speed processings; a line buffer 2808 for temporarily storing the output image data from the digital image processing circuit 2807; an interface 2809 for communication with an external equipment 2810 such as a personal computer; a system controller 2811 for releasing control signals based on a stored sequence program of the entire film scanner and adapted to execute various operations according to instruction from the external equipment 2810; a CPU bus 2812 connecting the digital image processing circuit 2807, the line buffer 2808 and the interface 2809 and composed of an address bus and a data bus; a sub scanning motor 2813 composed of a stepping motor for displacing the film holder 2802 in the sub scanning direction; a sub scanning motor driver 2814 for driving the sub scanning motor 2813 according to a command from the system controller 2811; sub scan position detecting unit 2815 composed of a photointerrupter for detecting a projection of the film holder 2802, for detecting a reference position of the sub scanning; and a light source activation circuit 2816 for activating the illuminating light source 2801.

The film scanner is constructed as explained in the foregoing, and is adapted to release image data to the external equipment 2810 according to a software of the system controller 2811 (hereinafter called "firmware") and a software (hereinafter also called driver software) for operating the film scanner from the external equipment such as the personal computer 2810. The procedure will be explained briefly with reference to FIG. 29. It is assumed that the film scanner and the external equipment 2810 are powered, that the firmware and the driver software are activated and that the film has been loaded by the user in a predetermined position of the film holder 2802.

At first, in a step S2901, the user enters a preview command from the external equipment 2810, which in response provides, through the driver software, the firmware with the designated information, including the kind of the film, the reading area (entire image area in this case) and the reading resolution (low resolution).

In a next step S2902, the firmware sets the designated information, namely the film kind, the reading area and the reading resolution, on the system controller 2811, thereby effecting electrical preparation.

In a next step S2903, the sub scan position detecting unit 2815 read the information of the sub scanning position, and the system controller so controls the sub scanning motor 2813 as to bring the film to an initial position.

In a next step S2904, the system controller 2811 sends a command to turn on the light source to the light source activation circuit 2816, thereby turning on the light source 2801.

Then, in a step S2905, the system controller 2811 outputs a command for the output of timing pulses (driving pulses for the linear image sensor 2804, RAM address control pulses etc.) for the reading of a line.

A next step S2906 reads the image data of each line with a predetermined exposure time and drives the sub scanning motor 2813 with a predetermined speed. Thereafter the digital image processing circuit 2807 executes the image processing, and the image data are output to the external equipment 2810.

When the scanning of the above-mentioned image reading area is completed in a step S2907, the system controller 2811 drives the sub scanning motor 2813 to return the film holder to the initial position. Also the light source 2801 is turned off, and various functions are terminated as soon as all the image data are output from the digital image processing circuit 2807.

A next step S2908 terminates the scanning, and the firmware of the system controller 2811 enters a routine for awaiting a next command.

In a next step S2909, the external equipment 2910 receives the image data and displays them in succession on a display or the like connected to the external equipment 2810, thereby providing the user with the entire image of the film.

Then, in a step S2910, the user observes the displayed preview image, then sets the image fetching conditions and instructs the main scanning. As in the step S2901, the designated information including the kind of the film, the reading area (area designated by the user) and the reading resolution (resolution designated by the user), are transmitted to the firmware.

In a step S2911, the firmware of the system controller 2811 receives the reading conditions and executes the operations of the steps S2902 to S2908 under the conditions for the main scanning.

In a step S2912, the image data are transmitted to the external equipment 2810 and displayed by the software, and can be stored in another memory medium (such as hard disk, magnetooptical disk or floppy disk) of the external equipment 2810.

In the above-explained film scanner, the shading data are usually obtained in a state prior to the start of scanning, where the scanning motor is stopped and the light source is turned on. However, in the actual image reading operation, since the scanning motor is activated, the light amount distribution of the light source becomes different from that in reading the shading data because of the fluctuation of the power supply voltage resulting from the driving of the scanning motor. For this reason the exact correction of the shading has not been possible and the deterioration of the image quality has been unavoidable.

SUMMARY OF THE INVENTION

An object of the present invention is to provide an image reading apparatus capable of image reading of high quality.

Another object of the present invention is to provide an image reading apparatus capable of stable image reading.

The above-mentioned objects can be attained, according to an embodiment of the present invention, by an image reading apparatus comprising an image sensor for reading an image and outputting an image signal; movement means for causing a relative movement between the image sensor and the image; correction means for effecting shading correction on the image signal; and control means for controlling the movement means so as to effect movement with plural different moving speeds and causing the correction means to effect the shading correction on the image signal according to the plural moving speeds.

Such configuration enables to achieve stable image reading with high quality.

Still other objects of the present invention, and the features thereof, will become fully apparent from the following description, which is to be taken in conjunction with the appended drawings.

BRIEF DESCRIPTION OF THE DRAWINGS

FIG. 4 is a view showing the structure of the light receiving portion of the image sensor;

DESCRIPTION OF THE PREFERRED EMBODIMENTS

Figure 1:
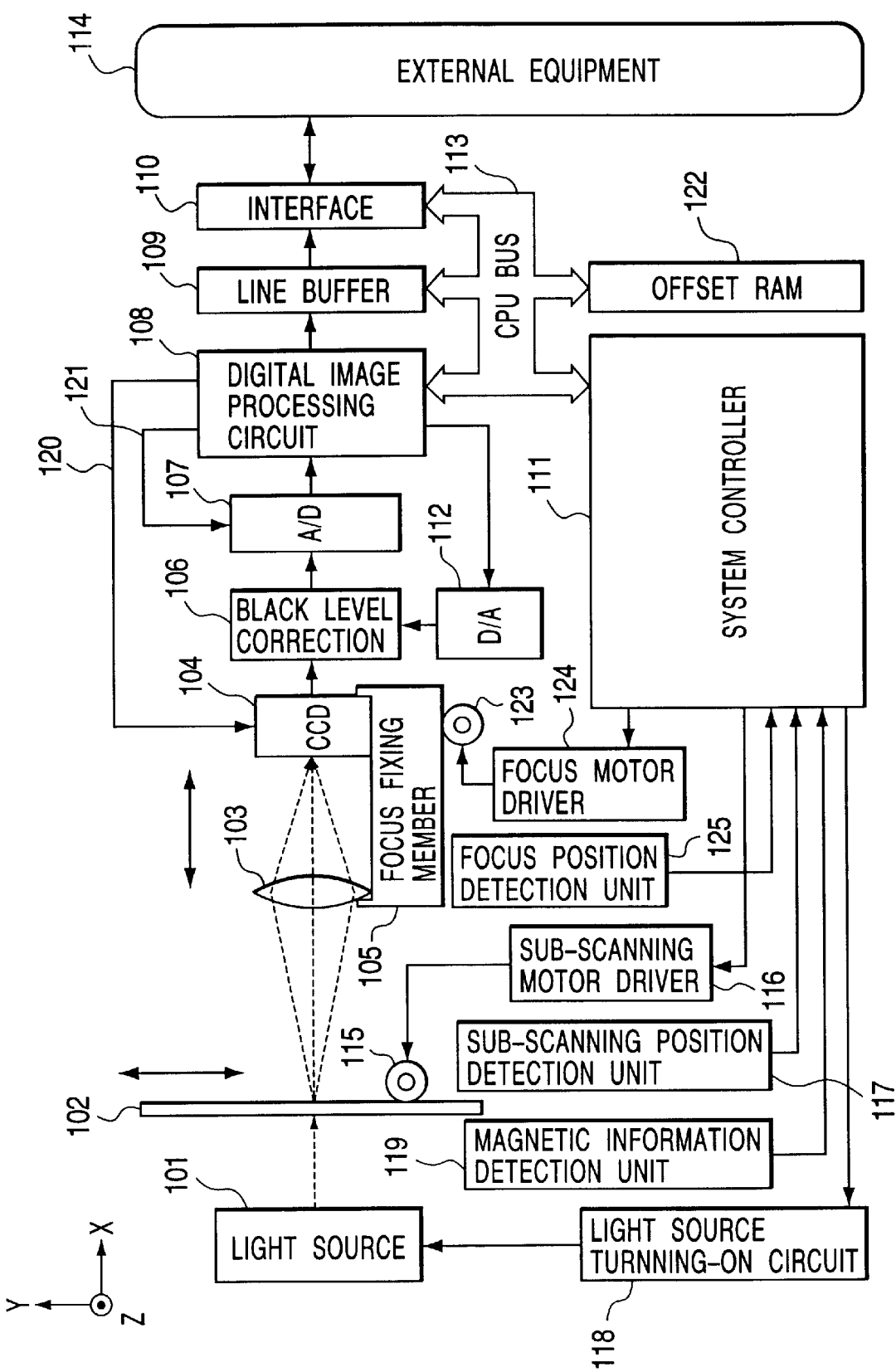
FIG. 1 is a block diagram showing an embodiment of the present invention.

FIG. 1 is a block diagram showing a film scanner, embodying the image reading apparatus of the present invention, wherein provided are a cold cathode tube 101 constituting the illuminating light source; a translucent original 102 such as a film of the Advanced Photo System standard, illustrated integrally with a film holder and rendered movable in a direction Y; an imaging lens system 103; a CCD linear image sensor 104 (hereinafter simply called linear image sensor), which is so positioned that its longitudinal direction is along the Z-direction on the drawing, whereby the main scanning direction (Z-direction) which is along the longitudinal direction of the linear image sensor 104 becomes perpendicular to the sub scanning direction (Y-direction) which is the moving direction of the film 102; a focus fixing member 105 which integrally supports the linear image sensor 104 in the vicinity of the image plane of the imaging lens system 103 and is rendered movable in the axial direction or the X-direction in the drawing; a black level correction circuit 106 for adjusting the black level of an analog image signal released from the linear image sensor 104 for example by a clamping circuit; and an A/D converter 107 for converting the analog signal, after the black level correction in the black level correction circuit 106, into a digital signal.

A digital image processing circuit 108 executes the image processing and processes the CCD driving pulses as will be explained later. The digital image processing circuit 108 is composed of a gate array and is capable of high-speed processing. There are also provided a line buffer 109 serving to temporarily store the image data from the digital image processing circuit 108 and composed of an ordinary random access memory (RAM); an interface 110 executing data exchange with an external equipment 114 such as a personal computer; a system controller 111 outputting control signals for various units according to a stored sequence program for the entire film scanner and executing various operations according to the commands from the external equipment 114; and a CPU bus 113 connecting the system controller 111, the digital image processing circuit 108, the line buffer 109 and the interface 110 and composed of an address bus and a data bus.

There are further provided a sub scanning motor 115 composed of a stepping motor, for moving the film 102 in the sub scanning direction (Y-direction); a sub scan motor driver 116 for driving the sub scanning motor 115 according to the command from the system controller 111; a sub scanning position detection unit 117 for detecting the reference position of the sub scanning, composed of a photointerruptor for detecting a perforation of the film; a light source turn-on circuit 118 composed of so-called inverter circuit for driving the cold cathode tube 101; and a magnetic information detecting unit 119 composed of a reproducing magnetic head for detecting magnetic information, recorded on the film surface and indicating the photographing environment.

There are further shown a drive signal 120 for driving the linear image sensor 104; a sample hold control signal 121 for effecting sample holding of the input signal; a RAM 122 called the offset RAM and serving as a working area in the image processing, for temporarily storing the image data and various data in the shading correction, gamma correction, color data synthesis etc. as will be explained later; a focusing motor 123 for axially moving the focus fixing member 105; a focusing motor driver 124 for supplying the focusing motor 123 with a drive signal; and a focus position detection unit 125 for detecting the initial position of the focus fixing member 105.

Figure 2:
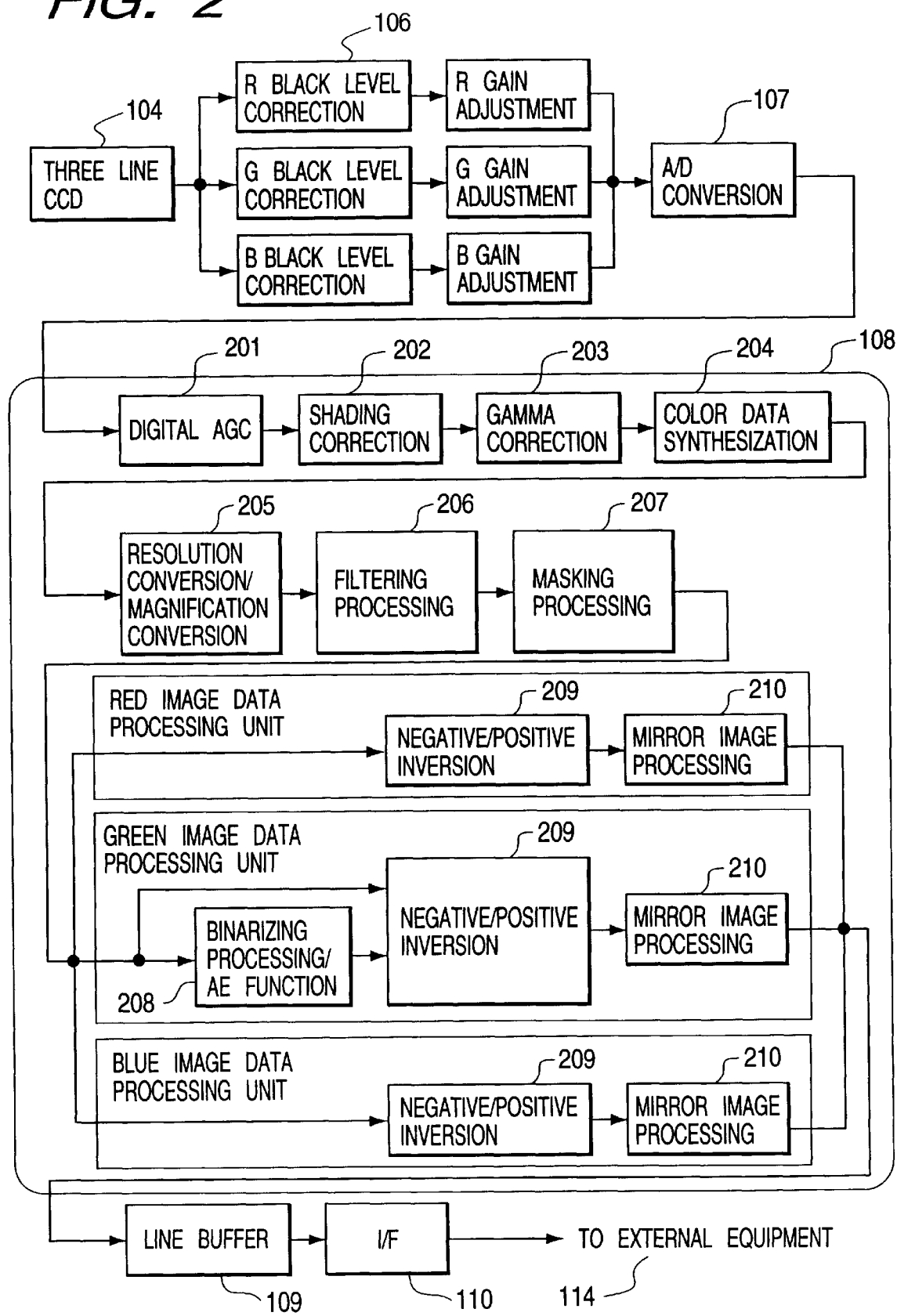
FIG. 2 is a view showing an image processing sequence.
Figure 3:
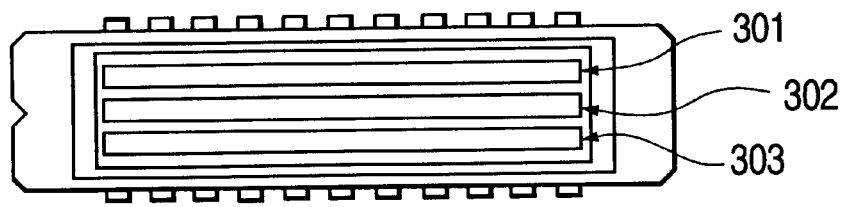
FIG. 3 is a view showing the light receiving portion of an image sensor.

FIG. 2 is a block diagram showing the portions relating to the digital image processing circuit 108. A three-line linear image sensor 104 has a rectangular light reception face composed of a sensor chip mounted on an IC substrate having terminals as shown in FIG. 3. The three-line linear image sensor 104 is a one-chip photoelectric converting apparatus composed of an array of several thousand square photosensor elements of several micrometers in size, for each of red, green and blue image reading (thus three arrays in total), and also incorporating a circuit for achieving the scanning function. Line sensors 301, 302, 303 respectively for receiving the green, blue and red lights are positioned in parallel, with a predetermined spacing therebetween. FIG. 4 shows the structure of the light reception portion. As the green light reception portion 301, the blue light reception portion 302 and the red light reception portion 303 are of a same structure, FIG. 4 shows the structure of the blue light reception portion 302 in a magnified manner as a representative example. When the light falls on a light reception portion 401, a photodiode 402 generates a charge proportional to the amount of incident light, thereby causing a current in a direction 403, whereby a charge corresponding to the amount of light is accumulated in a capacitor 404. The charges accumulated in the light reception portion 401 are simultaneously transferred to a transfer portion 407, by the simultaneous closing of all the switches 406 of a shift portion 406. The charges transferred to the transfer portion 407 are transferred in the main scanning direction by transfer pulse signals 408, 409 of different phases, then converted into voltage signals by an amplifier 408 and output to the outside as a CCD output. The signals supplied from the outside (control signal for the switches 406, transfer pulse signals 407, 408 etc.) correspond to the CCD drive signal 120 shown in FIG. 1 and are generated at predetermined timings by the digital image processing circuit 108.

Figure 5:
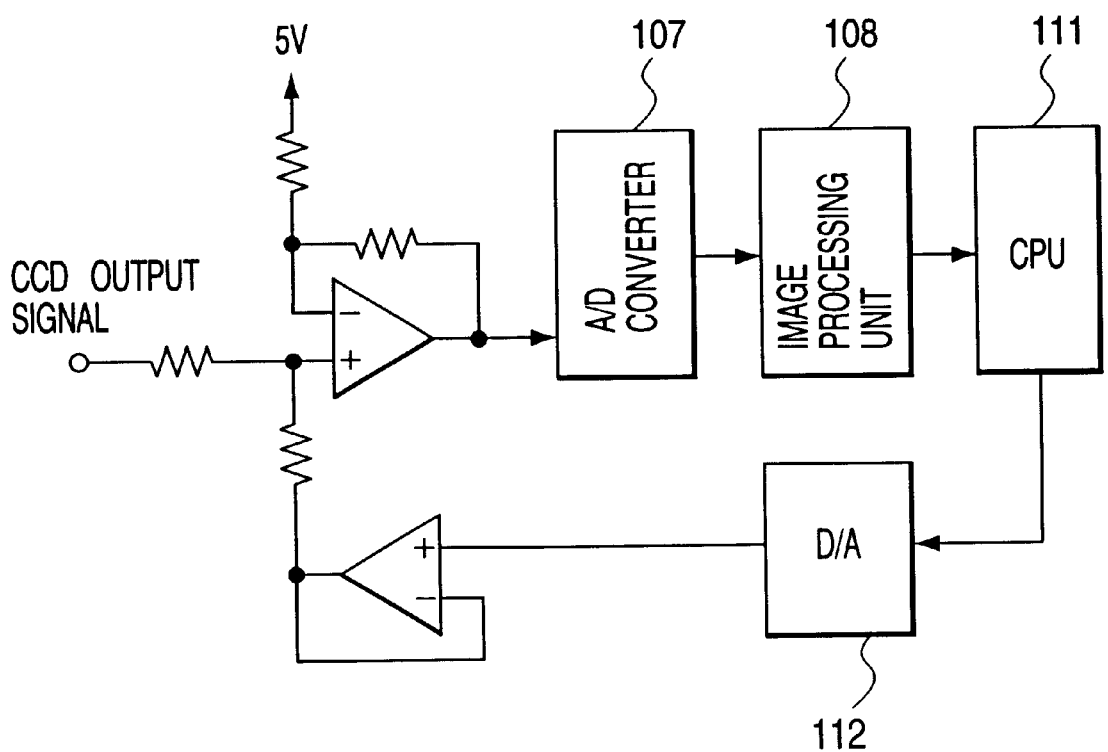
FIG. 5 is a circuit diagram showing a black level correction circuit.

Referring to FIG. 1, the output signal from the CCD linear image sensor 104 is obtained by merely amplifying the output of the CCD and is unstable with respect to the position of the reference. The black level correction circuit 106 performs a function of stabilizing the black level of the image by adjusting the CCD output in such a manner that the maximum value of the input signal to the A/D converter 107 becomes 5 V. FIG. 5 shows the method for black level correction. The system controller (CPU) 111 monitors the input voltage to the A/D converter 107. Upon detecting, through the digital image processing circuit 108, an input voltage exceeding 5 V to the A/D converter 107, the system controller 111 generates, based on the A/D-converted image data, negative data which will bring the image signal to 5 V or lower. The generated data are converted by a D/A converter 112 into an analog signal which is added through a voltage follower circuit to the image signal. In this manner the input voltage to the A/D converter 107 is reduced and the black level is stabilized.

Figure 6:
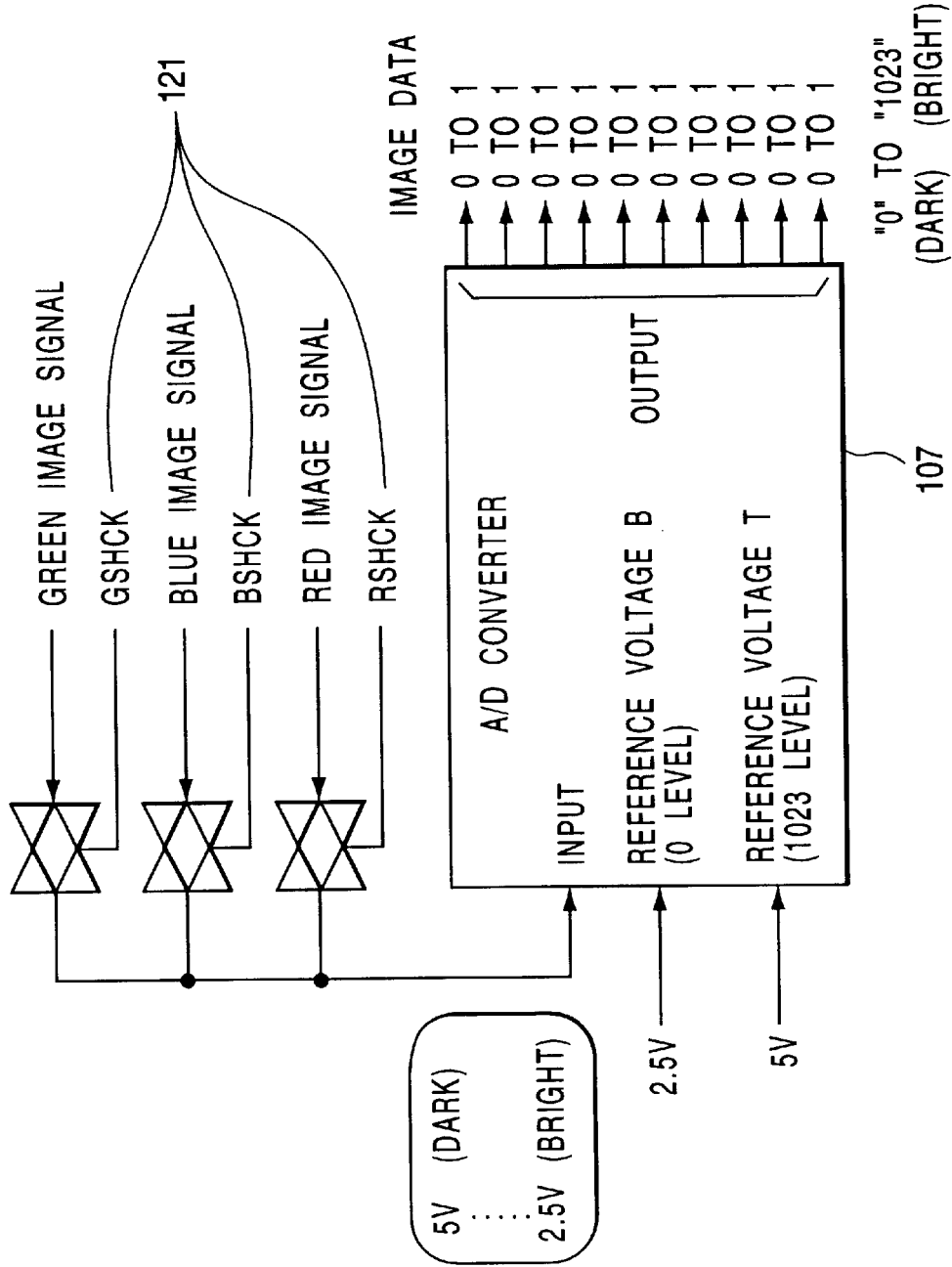
FIG. 6 is a circuit diagram of an A/D converter.

The image signal (analog signal) of each color, subjected to the black level correction and the gain adjustment, is converted, as shown in FIG. 1, into a digital signal by the A/D converter 107 under the control by a sample-hold control signal generated from the digital image processing circuit 108. The mode of this processing is shown in FIG. 6, in which RSHCK, GSHCK, BSHCK indicate the sample-hold control signals mentioned above and are supplied to an input port of the A/D converter. By these signals, the red, green and blue image signals are converted, in succession and in this order, into 10-bit digital image data by the A/D converter 107. Reference voltages of +5 V and +2.5 V are respectively supplied to reference voltage ports T, B of the A/D converter 107, which outputs a value "1023" as the same value as the reference voltage T in case that the input signal is 5 V and a value "0" as the same value as the reference voltage B in case that the input signal is 2.5 V. In the foregoing description, the image signals of different colors are processed by a common A/D converter, but there may be provided plural A/D converters respectively for the red, green and blue image signals.

Figure 7:
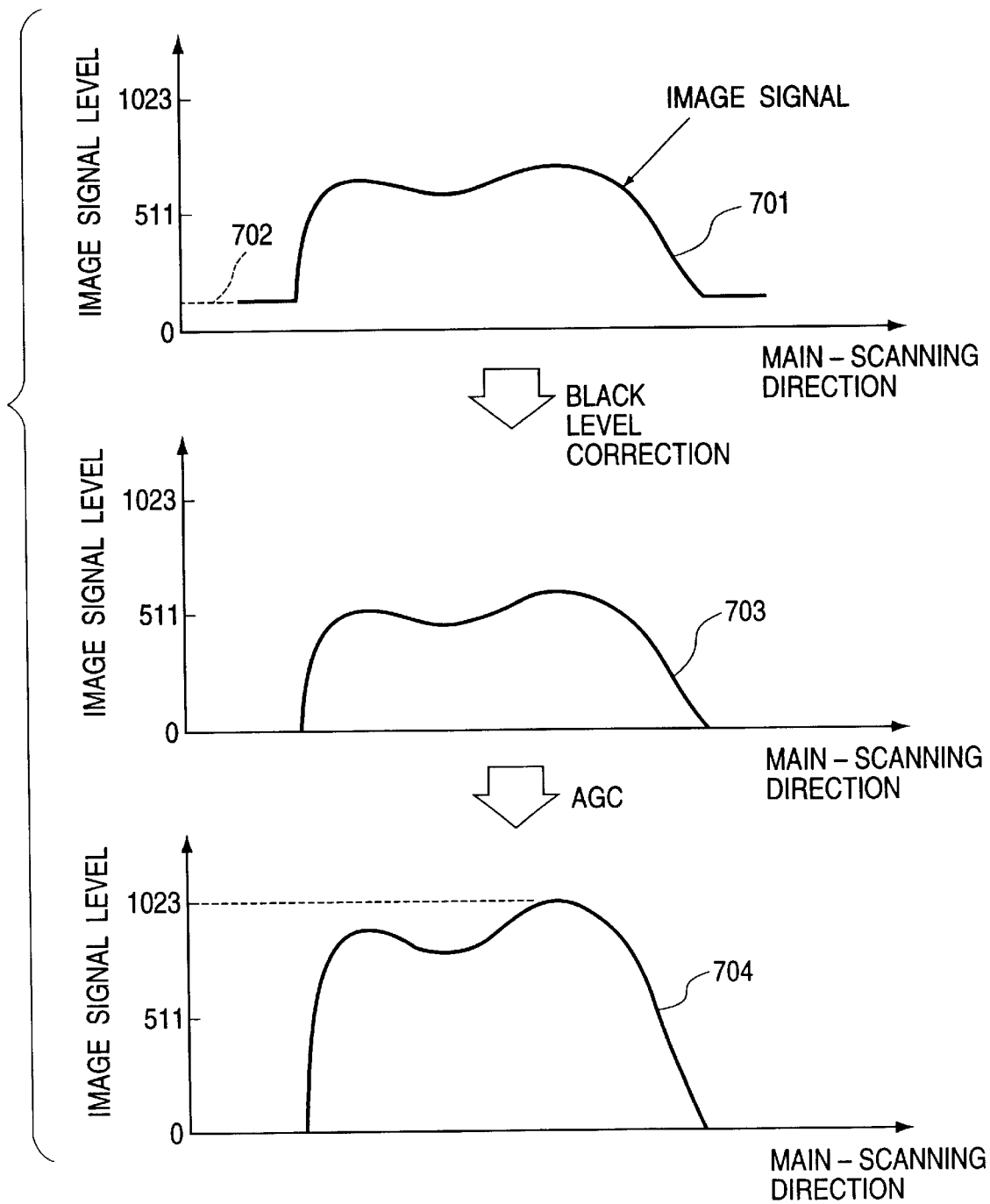
FIG. 7 is a chart showing image data before and after the black level correction.

The digital image data are thereafter subjected to the following image processing, as shown in FIG. 2, in the digital image processing circuit 108. A digital auto gain control (AGC) circuit 201 adjusts the balance of the image data of the different colors as shown in FIG. 7. For achieving this balance, after the stable black level is secured by the black level correction circuit 106, there is further executed a digital black level correction, which is achieved by subtracting, from the entire image data shown in FIG. 7, pixel values corresponding to an optically black portion in the CCD output 702. Image data 703 are the data after the digital black level correction. The data of the different colors are then balanced by multiplying the data of each color by 1 to 2 times. The data 704 represents an example of a color, after subjected to the auto gain control in such a manner that the maximum value of the image data 703 becomes equal to "1023".

Figure 8:
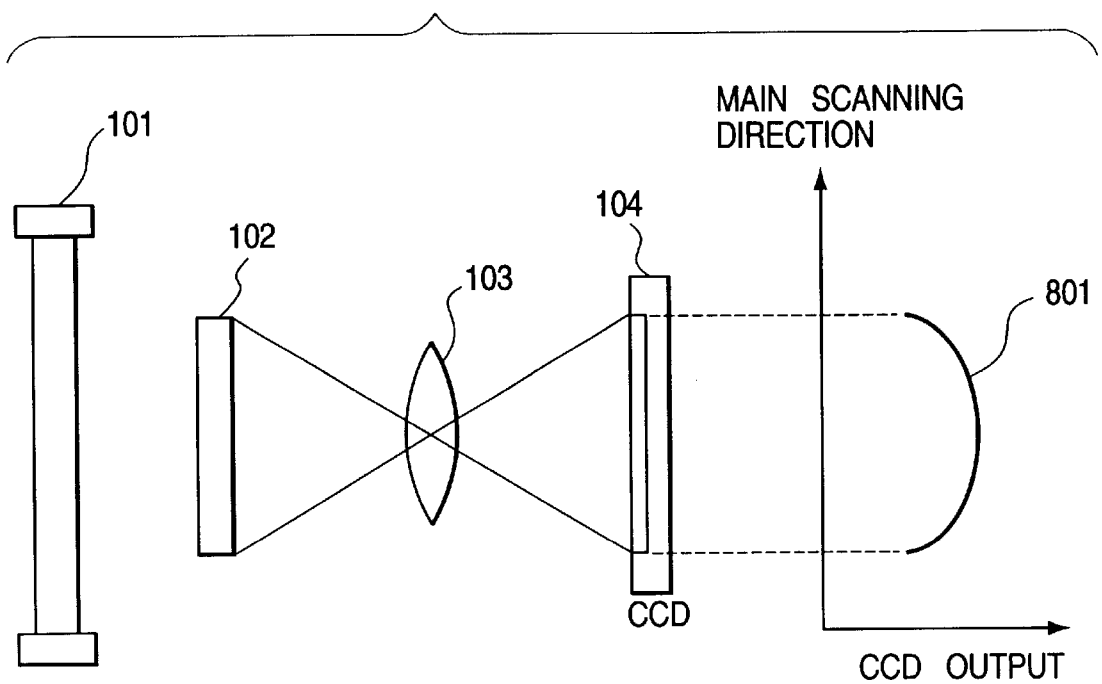
FIG. 8 is a view explaining the light amount distribution in the main scanning direction before the shading correction.

In FIG. 2, there is provided a shading correction circuit 202. In case no film is inserted, the image signals from the pixels of the linear image sensor 104 are not uniform, as shown in FIG. 8. This is because:

(1) the amount of light from the illuminating lamp 101 is larger in the center than in the end portions;

(2) the amount of light transmitted by the lens 103 is larger in the central area than in the peripheral area; and (3) the photosensor elements of the linear image sensor 104 have fluctuation in the sensitivity; so that the output image signal for example assumes a form 801. The shading correction is to correct such unevenness. Prior to the insertion of the film 102, the red, green and blue photosensor elements read the light intensity distribution on the film plane in the main scanning direction, and the obtained data are stored in the offset RAM 122.

The light source 101 is controlled by the light source turn-on circuit 118 and the sub scanning motor 115 is controlled by the sub scan motor driver 116. The light source turn-on circuit 118 and the sub scan motor driver 116 are controlled by the system controller 111 and the electric power supply to these units is made from a power supply unit of the system controller 111. As the electric power supplied to the light source 101 becomes different according to whether the sub scanning motor 115 is driven or not while the light source is turned on, so that the light amount distribution is influenced.

In the present embodiment, the system controller 111 sends a command to the sub scanning motor driver 116 to get the shading data while driving the sub scanning motor 115. In this manner the variation in the light amount distribution of the light source 101, resulting from the driving voltage of the sub scanning motor 115, can be reproduced, and the shading data can be acquired under the light amount distribution same as that in the actual image reading operation. In case there are plural image reading speeds, the driving voltage for the sub scanning motor 115 is varied according to such plural image reading speeds and plural shading data are acquired respectively corresponding to such plural image reading speeds. As a result, there can be constantly achieved satisfactory and stable shading correction even in case plural image reading speeds are employed, and the image reading of high quality can be realized.

Then, for the shading correction, the system controller 111 reads and compares the data, stored in the offset RAM 122, with target white density data, and stores the difference as shading data again into the offset RAM 122. At the actual film scanning operation, the shading correction on the image data are executed, utilizing the shading data stored in the offset RAM 122.

Figure 9:
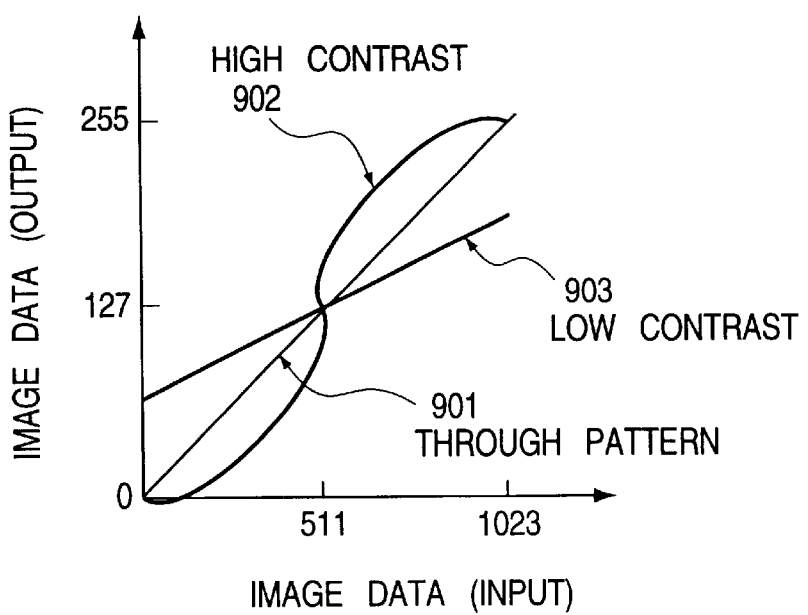
FIG. 9 is a chart showing the relationship between the input image density and the output image density.
Figure 10:
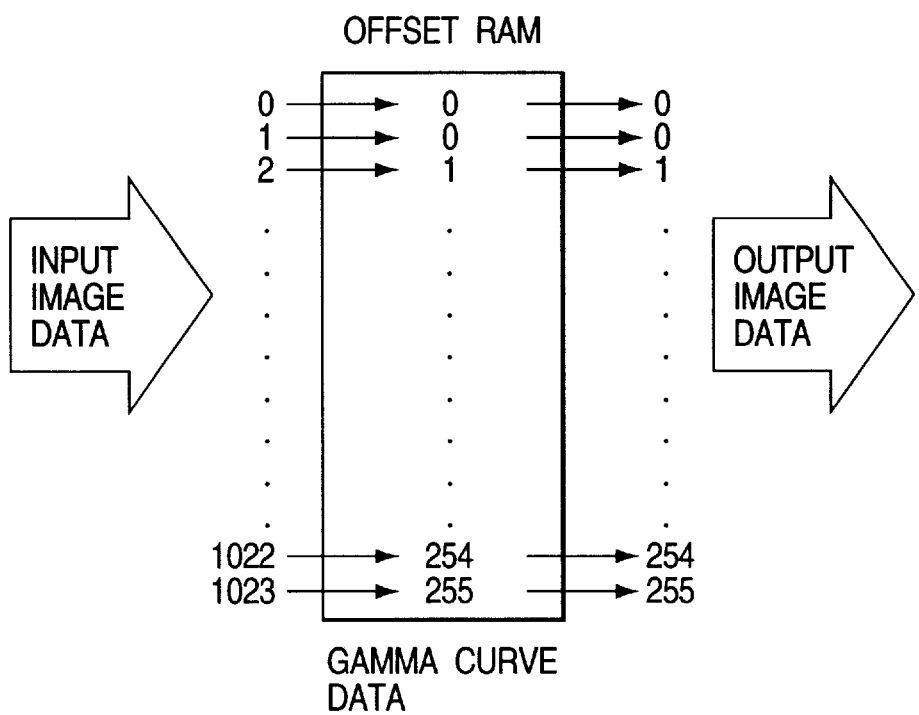
FIG. 10 is a view showing the concept of gamma conversion.

A gamma correction circuit 203 effects image contrast adjustment and conversion of 10-bit image data into 8-bit image data. FIG. 9 shows a gamma correction curve employed in the gamma correction circuit 203, for converting the input image data (0–1023) represented in the ordinate into output image data (0–255) into the output image data in the abscissa. In FIG. 9, a gamma curve 901 represents a through pattern for straight conversion from the 10-bit input image into the 8-bit output image data. A gamma curve 902 represents a gamma curve of a high contrast pattern, for effecting a gamma correction emphasizing the image contrast. A gamma curve 903 represents a gamma curve of a low contrast pattern, for effecting a gamma correction reducing the image contrast. Such gamma corrections are shown in a gamma correction window displayed on the display of the external equipment 114 and can be directly selected. The data of the selected gamma curve are communicated to the system controller 111 and are stored in the offset RAM 122, and the gamma correction is executed by the output of corresponding values of the gamma correction, with respect to the input image data. FIG. 10 conceptually shows the storage of the gamma correction curve, to be employed in the gamma correction circuit 203, in the offset RAM 122.

Figure 11:
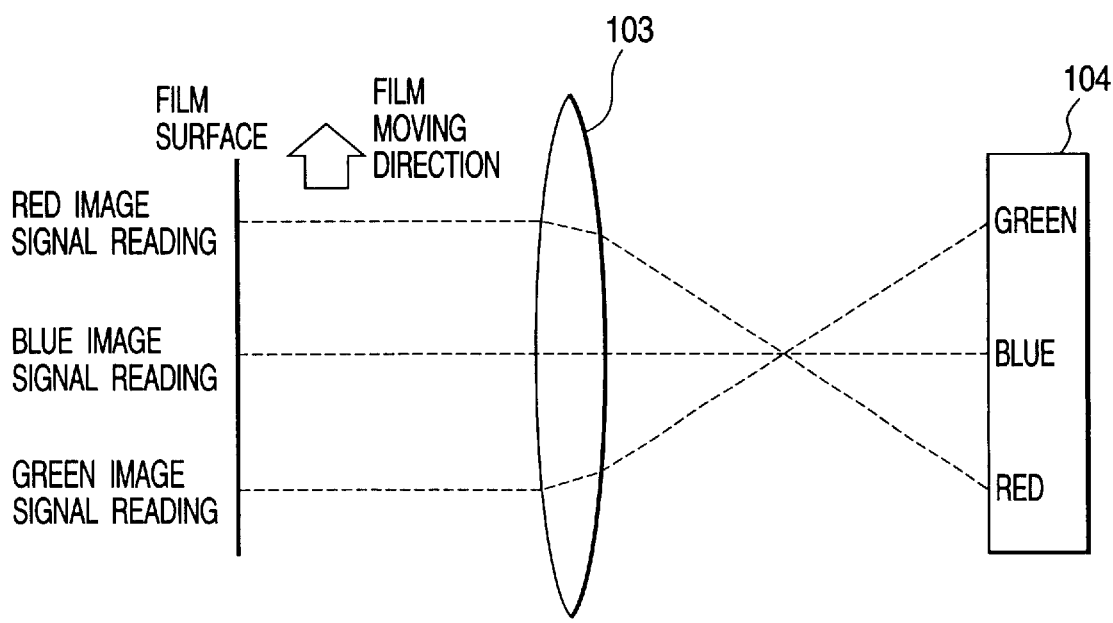
FIG. 11 is a view showing color image reading with a 3-line linear image sensor.

A color data synthesis circuit 204 corrects the aberration between the lines of the three-line linear image sensor 104. In the linear image sensor 104, as shown in FIG. 11, the lines for respectively reading red, green and blue colors are arranged in a mutually parallel manner, in a direction perpendicular to the film moving direction (sub scanning direction), so that the red, green and blue image data on a same scanning line are not read simultaneously but the image data are obtained from three lines which are mutually separated by several scanning lines. For this reason, the image data are accumulated in the offset RAM 122 and the color data of a single scanning line are released when such color data of a line consisting of different colors are accumulated in the offset RAM 122.

Figure 12:
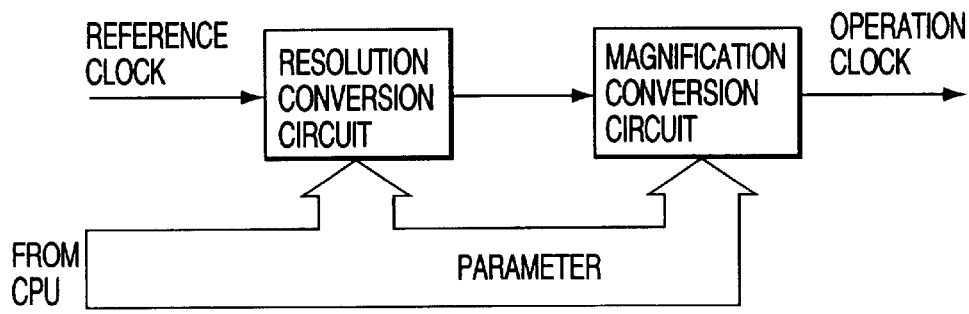
FIG. 12 is a view explaining the input of a resolution/magnification conversion parameter.
Figure 13:
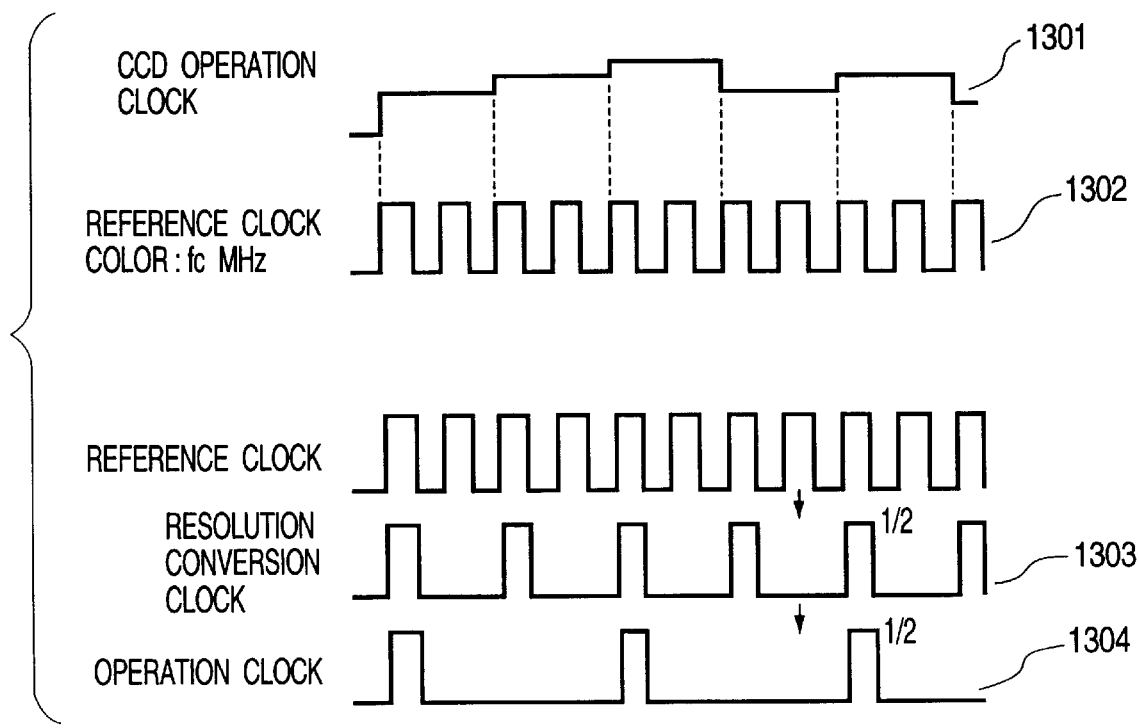
FIG. 13 is a view explaining the resolution/magnification conversion in the main scanning direction.
Figure 14A:
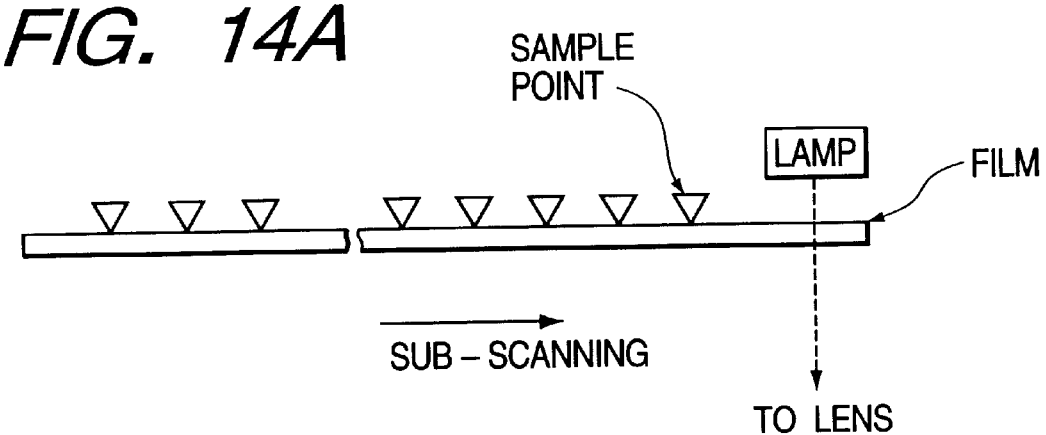
FIGS. 14A, 14B and 14C are views explaining the resolution/magnification conversion in the sub scanning direction.
Figure 14B:
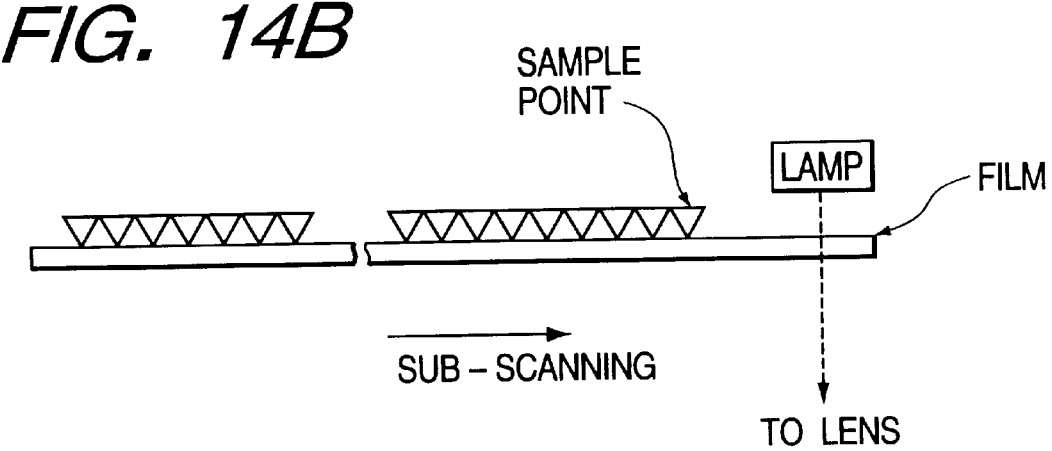
Figure 14C:
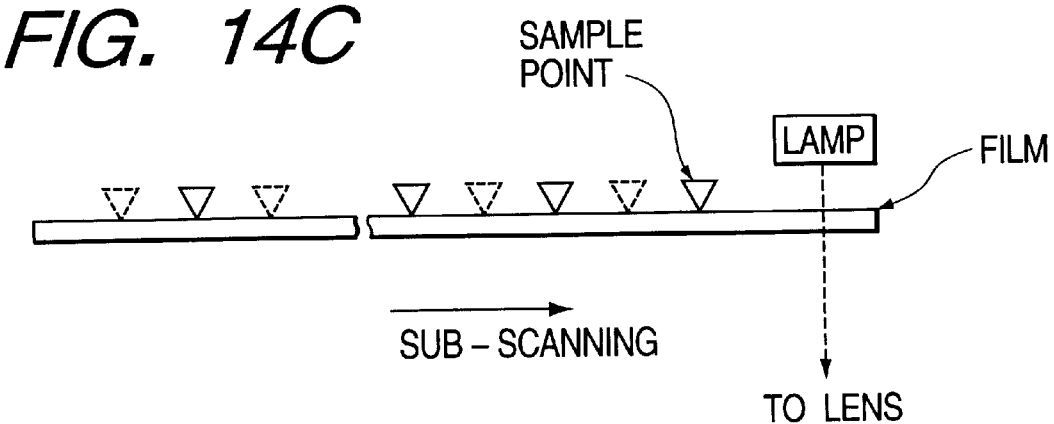

A resolution/magnification conversion circuit 205 sets the resolution or the magnification by a conversion parameter entered from the system controller 111 as shown in FIG. 12. FIG. 13 shows the principle of resolution/magnification conversion in the main scanning direction, wherein 1301 indicates a CCD operation clock signal, which is one of the CCD driving pulse signals 120 for driving the linear image sensor 104, and 1302 indicates a reference clock signal having a frequency equal to twice of that of the CCD operation clock signal 1301. The image processing based on the reference clock signal 1302 provides an output image with a resolution corresponding to 200% of the optical resolution since the output of a pixel is processed as two image data (corresponding to an instruction for an optical resolution of 1 time and a magnification of 200%). In case an instruction for an optical resolution of 1/2 times and a magnification of 100% is given from the external equipment 114, the resolution conversion circuit generates an operation clock signal 1303 by thinning out the reference clock signal 1302 to 1/2 and the magnification conversion circuit effects a thinning-out to 1/2 to generate an operation 1304. Then, FIGS. 14A to 14C illustrate the principle of resolution/magnification conversion in the sub scanning direction. FIGS. 14A to 14C show sampling points on the film in the sub scanning direction. In order to increase the resolution or the magnification, the film is moved at a lower speed than in the normal case, and the number of the sampling points is increased, as shown in FIG. 14B, in comparison with the normal case. On the other case, in order to decrease the resolution or the magnification, the film is moved with the normal speed but a part of the read data is not stored in the RAM, as shown in FIG. 14C. The decrease in the resolution or the magnification may also be achieved by moving the film at a higher speed than in the normal case.

A filtering process circuit 206 executes a filtering process for compensating the deterioration in the image quality, resulting from the conversion in the resolution/magnification conversion circuit 206. Table 1 summarizes the content of the filtering process.

TABLE 1

Filtering process

| gradation | resolution (dpi) | main scan inter-polation | sub scan inter-polation | averaging | smoothing | edge process |
|---|---|---|---|---|---|---|
| 24-bits | 170–340 | B | A | A | B | B |
| | 341–680 | B | A | A | B | B |
| | 681–1360 | B | A | A | B | B |
| | 1361–2719 | A | A | B | A | A |
| | 2720 | B | B | B | B | B |
| | 2720–5440 | A | B | B | A | A |
| 8-bits | 170–340 | B | A | A | B | B |
| | 341–680 | B | A | A | B | B |
| | 681–1360 | B | A | A | B | B |
| | 1361–2719 | A | A | B | A | A |
| | 2720 | B | B | B | B | B |
| | 2720–5440 | A | B | B | A | A |
| binary | 170–340 | B | A | A | B | A |
| | 341–680 | B | A | A | B | A |
| | 681–1360 | B | A | A | B | A |
| | 1361–2719 | A | A | B | A | A |
| | 2720 | B | B | B | B | B |
| | 2720–5440 | A | B | B | A | A |

A: YES
B: NO

This circuit selectively executes interpolation in the main scanning direction, interpolation in the sub scanning direction, averaging, smoothing and edge process depending on the gradation and the resolution. For example, for data with a gradation of eight bits and a resolution of 341–680 dots/inch, the interpolation in the sub scanning direction and the averaging are executed but the interpolation in the main scanning direction, the smoothing and the edge process are not executed. These processes can be employed in various manners according to the condition. The content of each of such filtering processes will not be explained.

Figures 15, 16:
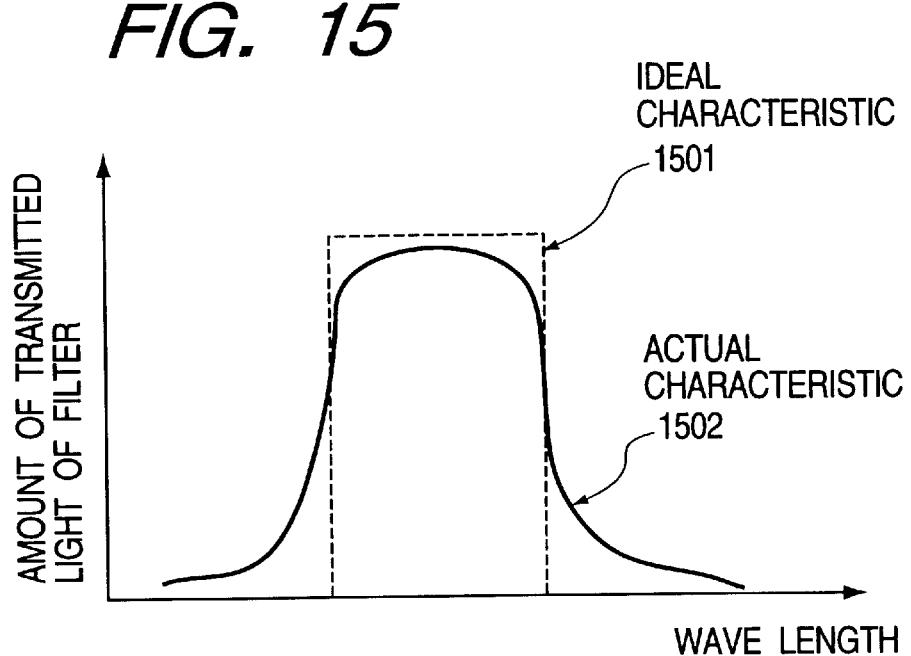
FIG. 15 is a view showing the spectral transmittance of a color filter.
FIG. 16 is a view explaining a binarizing circuit.

A masking process circuit 207 corrects the color balance by correcting the transmission characteristics of the R, G, B color filters on the linear image sensor 104. Each color filter ideally transmits the light of a predetermined wavelength region only and intercepts the light of other regions, as indicated by a curve 1501 in FIG. 15. However the actual filter transmits the light of unnecessary wavelength regions, as indicated by a curve 1502. In order to correct such color filter characteristics closer to the ideal characteristics, a masking correction is executed by multiplying the input signals of the different colors with selected masking coefficients, as indicated by the following formula:

$$\begin{bmatrix} R_{out} \\ G_{out} \\ B_{out} \end{bmatrix} = \begin{bmatrix} R_r & G_r & B_r \\ R_g & G_g & B_g \\ R_b & G_b & B_b \end{bmatrix} \begin{bmatrix} R_{in} \\ G_{in} \\ B_{in} \end{bmatrix}$$

wherein $R_{in}$, $G_{in}$, $B_{in}$ are input signals to the masking circuit 207, $R_{out}$, $G_{out}$, $B_{out}$ are output signals from the masking circuit 207, $R_r$, $G_r$, $B_r$ are correction coefficients for the red filter, $R_g$, $G_g$, $B_g$ are correction coefficients for the green filter and $R_b$, $G_b$, $B_b$ are correction coefficients for the blue filter.

A binarization/AE circuit 208 executes conversion of the eight-bit multi-value data into binary image data, representing white and black levels with one bit. When a binarization process is instructed from the external equipment 114, the system controller (CPU) 111 sets a parameter B in a slice level register 1601 shown in FIG. 16. A comparator 1602 compares the eight-bit multi-value data A with the parameter B, and sets "1" in case of A >B but otherwise sets "0", thereby outputting binary data. The circuit also executes an AE function by automatically varying the slice level according to the change in the original density in the course of the film scanning operation, thereby generating binary data of satisfactory reproducibility. This function is achieved by extracting the white and black peak values in every line in the film scanning operation, determining the slice level in succession and accordingly rewriting the content of the slice level register. The binarization/AE function circuit 208 executes the above-explained functions only on the green image data.

Figure 17A:
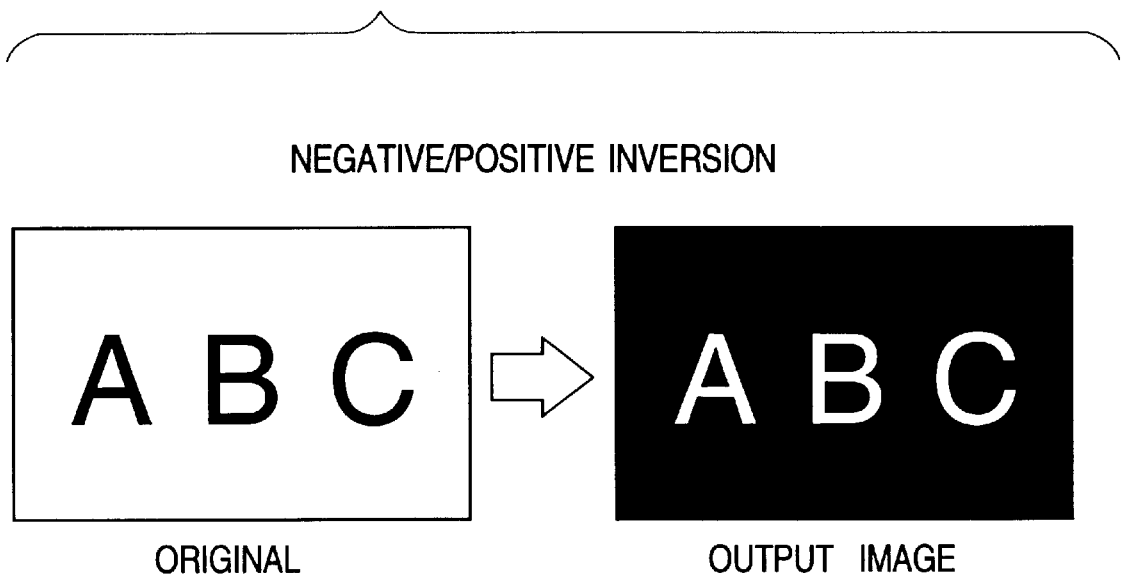
FIGS. 17A and 17B are views explaining a negative/positive inversion circuit.
Figure 17B:
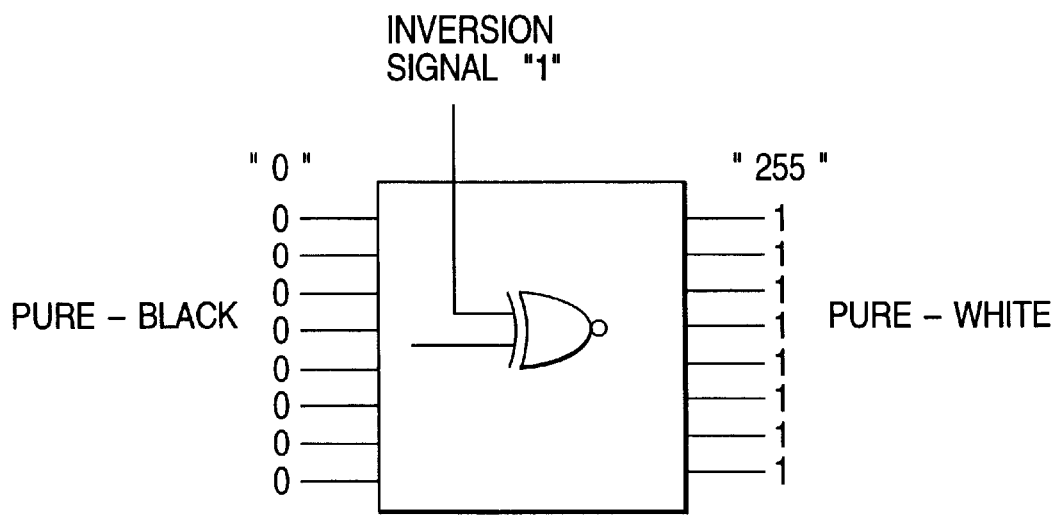

A negative/positive inversion circuit 209 performs a function of inverting the density level of the image data, with respect to that of the input original as shown in FIG. 17A. This circuit is composed, as shown in FIG. 17B, of an exclusive OR gate, which inverts the data of each pixel by an inversion signal "1" set by the system controller 111. The negative/positive inversion circuit 209 is provided for each color and sets "1" or "0" for each color according to the inversion signal.

Figure 18:
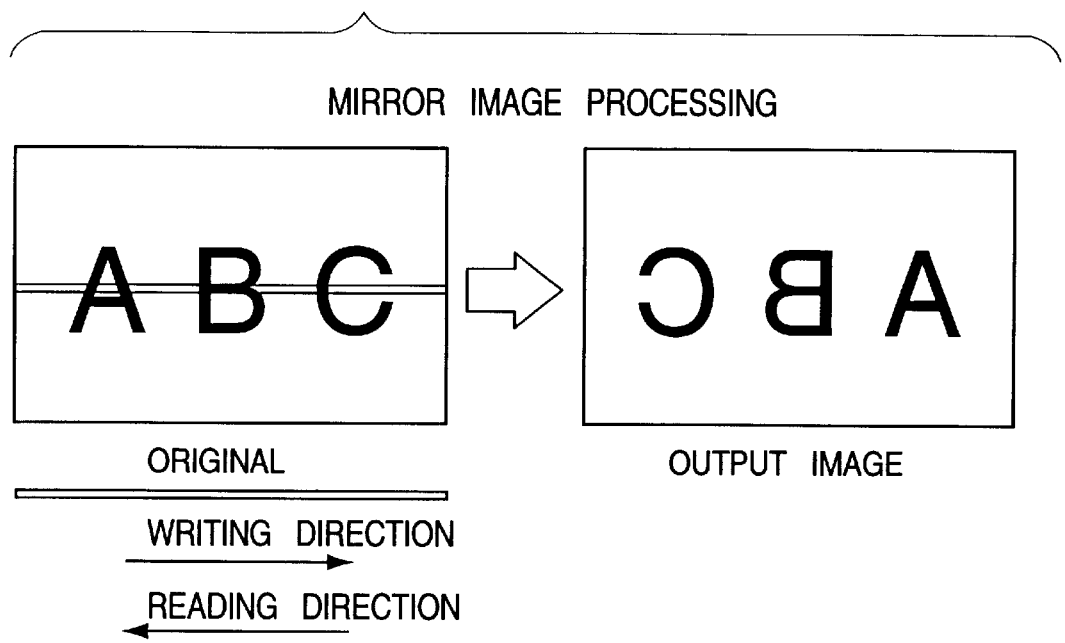
FIG. 18 is a view explaining a mirror image process circuit.

A mirror image process circuit 210 inverts the image in the lateral direction, as in the mirror reflection, by rotating the image data by 180° in the main scanning direction as shown in FIG. 18. This function is achieved by reading the image data, stored in an unrepresented memory or in the line buffer 109, from the opposite direction. The mirror image process circuit 210 may store the image data, after the mirror image process, into the line buffer 109 even in case the image data are read from a memory provided in the image process means for temporarily storing the image data.

Figure 19:
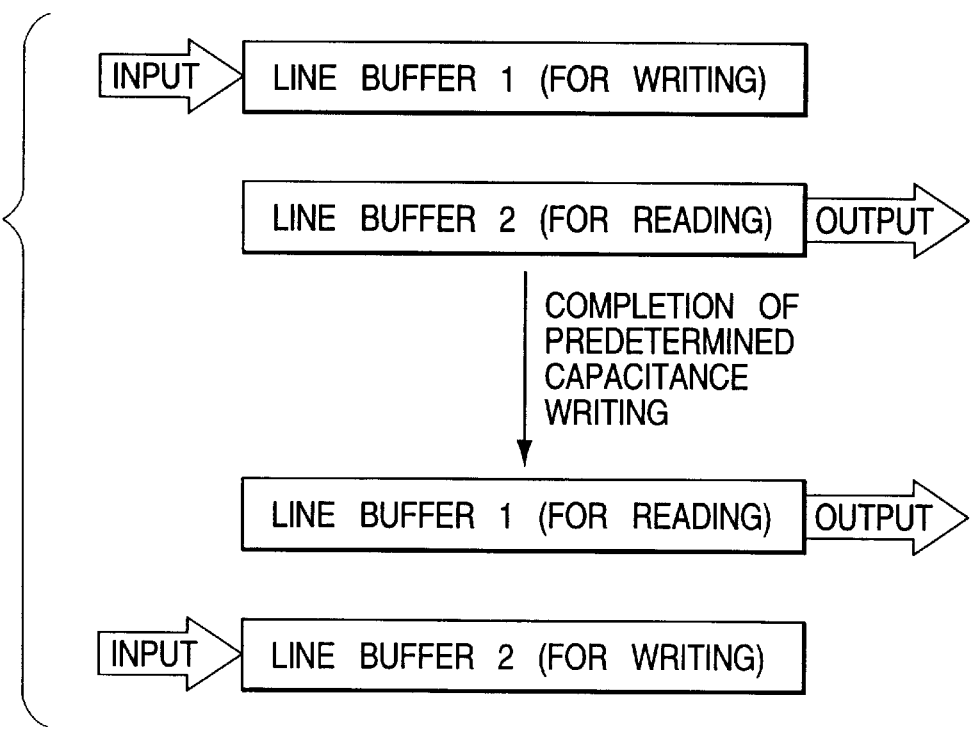
FIG. 19 is a view explaining a line buffer.

A line buffer 109 serves to temporarily store the image data after the image processing. It is divided into two blocks, as shown in FIG. 19, one of which is used for image data wiring while the other is in the image data reading, and the image writing operation is shifted to the image reading operation when the image writing is completed to a predetermined capacity.

An interface circuit 110, realized by a SCSI controller, serves to transfer data between the line buffer 109 or the system controller 111 and the external equipment 114. However the external equipment 114 may directly instruct the system controller 111 even without such interface if the corresponding function is provided in the external equipment 114.

Figure 20:
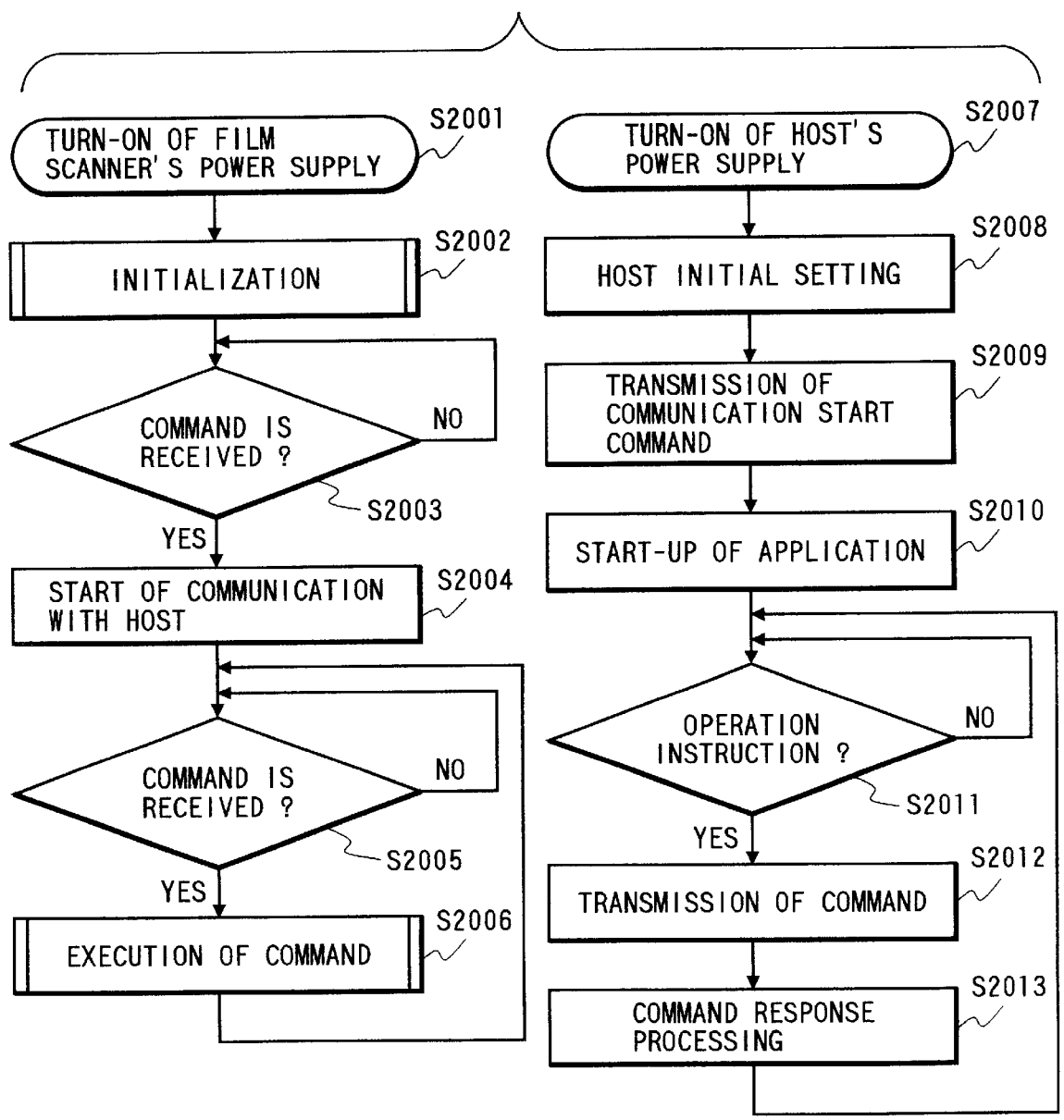
FIG. 20 is a flow chart explaining the communication pattern between the film scanner and the external equipment.

In the following there will be explained the function of the present film scanner. FIG. 20 is a flow chart showing the basic communication pattern between the film scanner and the external equipment 114, wherein the left-hand side indicates the function of the film scanner while the right-hand side indicates that of the external equipment 114.

A step S2001 turns on the power supply of the film scanner.

A step S2002 initializes the scanner (initialization of the firmware, software etc.).

Then a step S2007 turns on the power supply of the external equipment 114.

A step S2008 initializes the external equipment 114, and checks the memory and the SCSI apparatus by an operational program of the external equipment 114.

Then a step S2003 repeats a command waiting routine until a command is received from the external equipment 114. Upon receipt of a command is received from the external equipment 114, the sequence proceeds to a step S2004.

A step S2009 transmits a communication start command to the film scanner, thereby enabling communication with the film scanner.

Then a step S2004 initiates communication with the external equipment 114.

A step S2010 activates an application software, including a driver software.

Then, in a step S2011, the user enters, on the application of the external equipment 114, an operation instruction for instructing an operation to the film scanner. The ending command for the application is also included in the application program, and, when the ending command is selected, the communication and the application are terminated.

In a step S2012, the driver software prepares the operation instruction as a command and the command is outputted to the film scanner.

A step S2005 is a command waiting state. The step S2005 is repeated during the absence of command, and the sequence proceeds to a step S2006 upon receipt of a command.

A step S2006 receives the command from the external equipment 114, and the firmware issues an operation sequence and executes an operation. In response to the execution, information is transmitted from time to time to the external equipment 114.

A step S2013 receives information on the operation state from the film scanner and displays the information on the application. As soon as the termination of the command, the sequence returns to the step S2011.

In the following there will be explained the command reception/execution routine in the step S2006 of the firmware, with reference to a flow chart in FIG. 21.

At first a step S2101 discriminates whether the command from the external equipment 114 is a preview command, and, if so, the sequence proceeds to a step S2102, but, if not, the sequence proceeds to a step S2103.

A step S2102 executes a sequence for executing the preview command.

A step S2103 discriminates whether the command is a focusing command, and, if so, the sequence proceeds to a step S2104, but, if not, the sequence proceeds to a step S2105.

A step S2104 executes a sequence for executing the focusing command.

A step S2105 discriminates whether the command is a main scan command, and, if so, the sequence proceeds to a step S2106, but, if not, the sequence proceeds to a step S2107.

A step S2106 executes a sequence for executing the main scan command.

A step S2107 discriminates whether the command is an ejection command, and, if so, the sequence proceeds to a step S2108, but, if not, the sequence proceeds to a step S2109.

A step S2108 executes a sequence for executing the ejection command.

A step S2109 discriminates whether the command is a film type command, and, if so, the sequence proceeds to a step S2110, but, if not, the sequence proceeds to a step S2111.

A step S2110 executes a sequence for executing the film type command.

A step S2111 discriminates whether the command is any other command, and, if so, the sequence proceeds to a step S2112, but, if not, the sequence proceeds to a step S2113.

A step S2112 executes a sequence for executing such other command.

A step S2113 executes a sequence in case of the entry of an abnormal command, other than the executable commands registered in advance.

A step S2114 transmits the end of command execution to the external equipment 114 and terminates the command execution routine. Then the sequence returns to the step S2005 for receiving the command.

In the following there will be explained the flow of operations in succession. The initialization of the film scanner in the step S2002 of FIG. 20 proceeds as shown in a flow chart in FIG. 22.

A step S2201 executes memory checking of the line buffer 109 and the offset RAM 122.

A step S2202 initializes the input/output ports of the system controller 111.

A step S2203 initializes and activates the digital image process circuit 108.

In a step S2204, the system controller 111 reads the ID number of SCSI.

Then, in a step S2205, the system controller 111 drives the focusing motor 123 to move the lens to the focusing initial position, and at the same time checks the focus position detecting unit 125.

Then, in a step S2206, the system controller 111 drives the sub scanning motor 115 to cause movement to the sub scanning initial position, and at the same time checks the sub scan position detecting unit 117.

In a step S2207, the system controller 111 permits the digital image process circuit 108 to output the pulse drive signal 120.

Then a step S2208 executes the black level correction.

In a step S2209, the system controller 111 sends a light source turn-on command to the light source turn-on circuit 118 and a command to the sub scan motor driver 116 to drive the sub scanning motor 115. In this state, the light source 101 shows a light amount distribution same as in the main scanning operation, because of the voltage fluctuation caused by the driving voltage for the sub scanning motor 115. Thus there are prepared shading data, corresponding to the state of the main scanning operation. If plural image reading speeds are available, the driving voltage for the sub scanning motor 115 is set in succession to corresponding plural reading speeds, to prepare the shading data of plural sets.

In a step S2210, simultaneously with the entry of the shading data, the system controller 111 activates an internal timer, thereby starting the counting of time elapsing after the fetching of the shading data.

In a step S2211, the system controller 111 sends a light source turn-off command to the light source turn-on circuit 118.

Then a step S2212 sets the shading correction data in the offset RAM 122.

In a step S2213, the system controller 111 initializes the interface 110 (SCSI controller).

In a step S2214, the system controller 111 permits the communication of the interface 110.

A step S2215 terminates the initialization sequence, and the sequence then proceeds to the command reception step S2003.

In the following there will be explained the contents of the commands in the step S2006 in FIG. 21.

[Preview Command]

Figure 23:
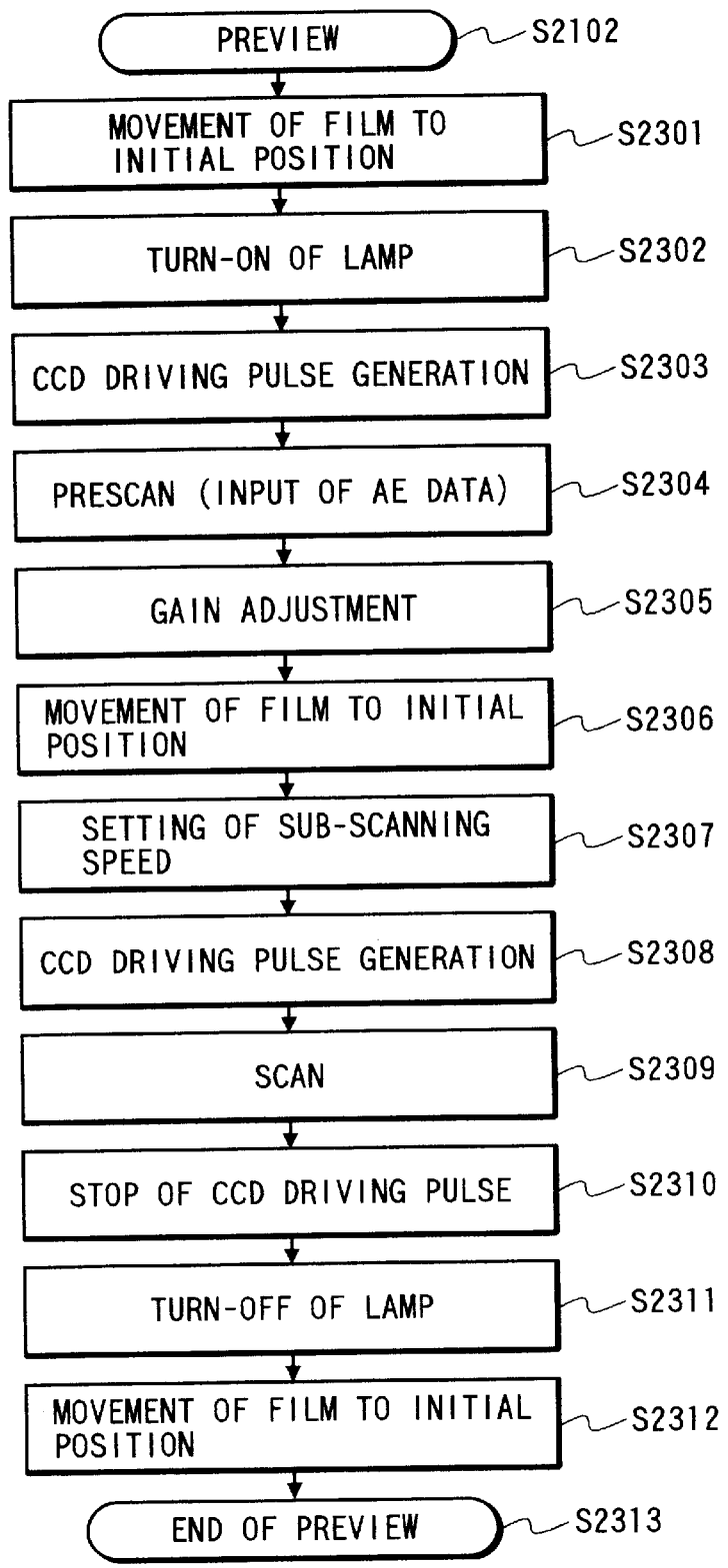
FIG. 23 is a flow chart explaining the sequence of a preview command.

FIG. 23 is a flow chart showing the content of the preview command S2102.

At first, in a step S2301, the system controller 111 monitors the state of the sub scan position detecting unit 117 and controls the sub scanning motor 115.

In a step S2302, the system controller 111 sends a light source turn-on command to the light source turn-on circuit 118.

In a step S2303, the system controller 111 causes the digital image process circuit 108 to generate the pulse drive signal 120.

A step S2304 executes the pre-scanning operation by controller the sub scanning motor 115 so as to place the reading position at the approximate center of the image frame to be read and enters the light amount data. The light amount measurement is conducted by the linear image sensor 104, but it may also be achieved by another exclusive sensor.

A step S2305 executes gain control based on the light amount data obtained in the step S2304, so as to increase or decrease the gain respectively if the light amount is deficient or excessive.

Then a step S2306 controls the sub scanning motor 116 to move the film to the initial position.

A step S2307 sets the sub scanning speed at the preview operation.

A step S2308 sets the resolution at the preview operation, and outputs the drive pulses 120 according to the setting by the resolution/magnification conversion circuit 205.

A step S2309 sets a signal processing area in the preview operation in the digital image process circuit 108 and initiates the scanning operation.

A step S2310 terminates the drive pulses 120 generated in the step S2308.

Then, in a step S2311, the system controller 111 sends a light source turn-off command to the light source turn-on circuit 118.

A step S2312 returns the film, moved by the scanning operation in the step S2309, to the initial position.

A step S2313 terminates the preview sequence.

[Focusing]

Figure 21:
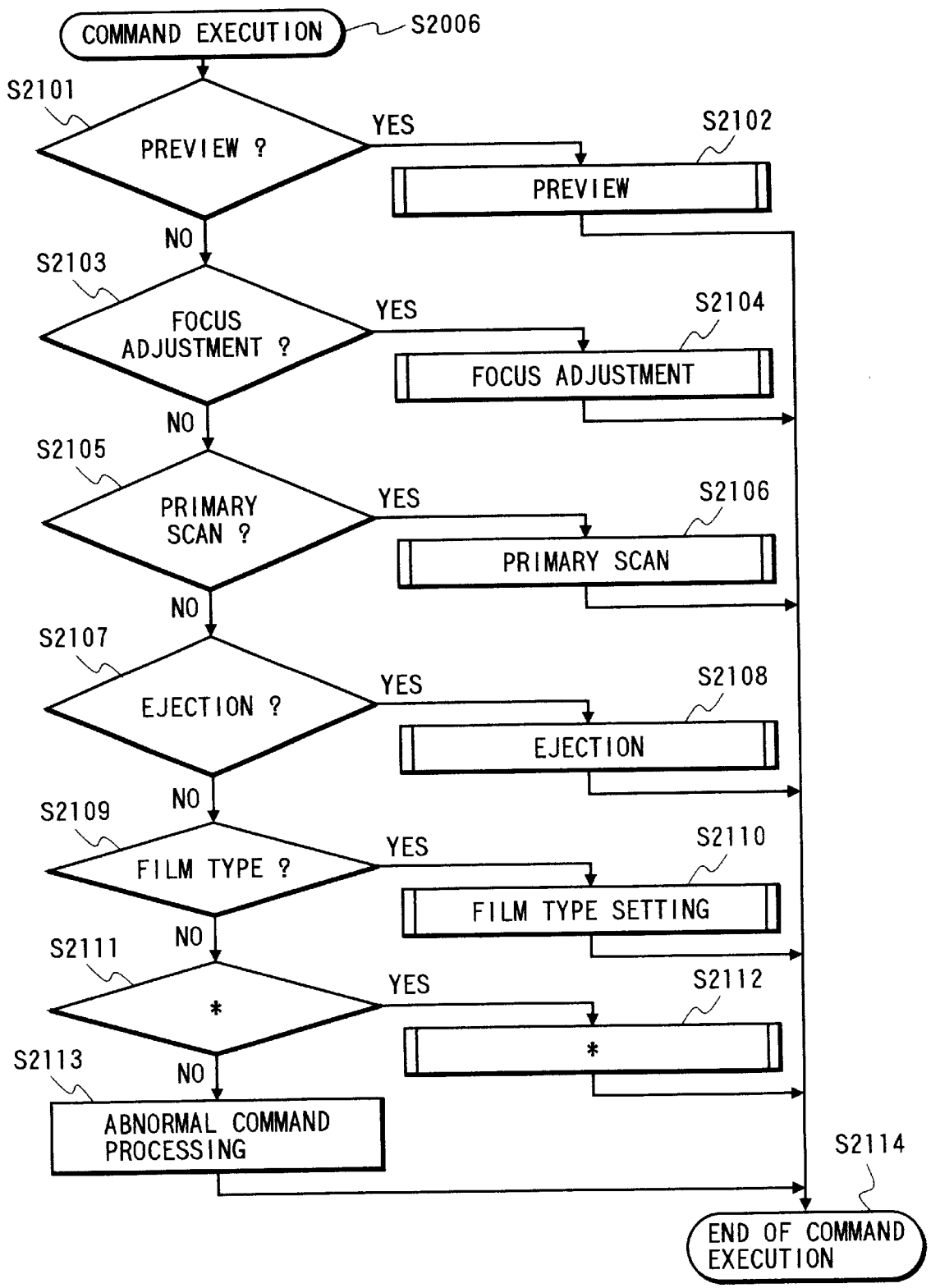
FIG. 21 is a flow chart explaining a command execution routine in the firmware.
Figure 24:
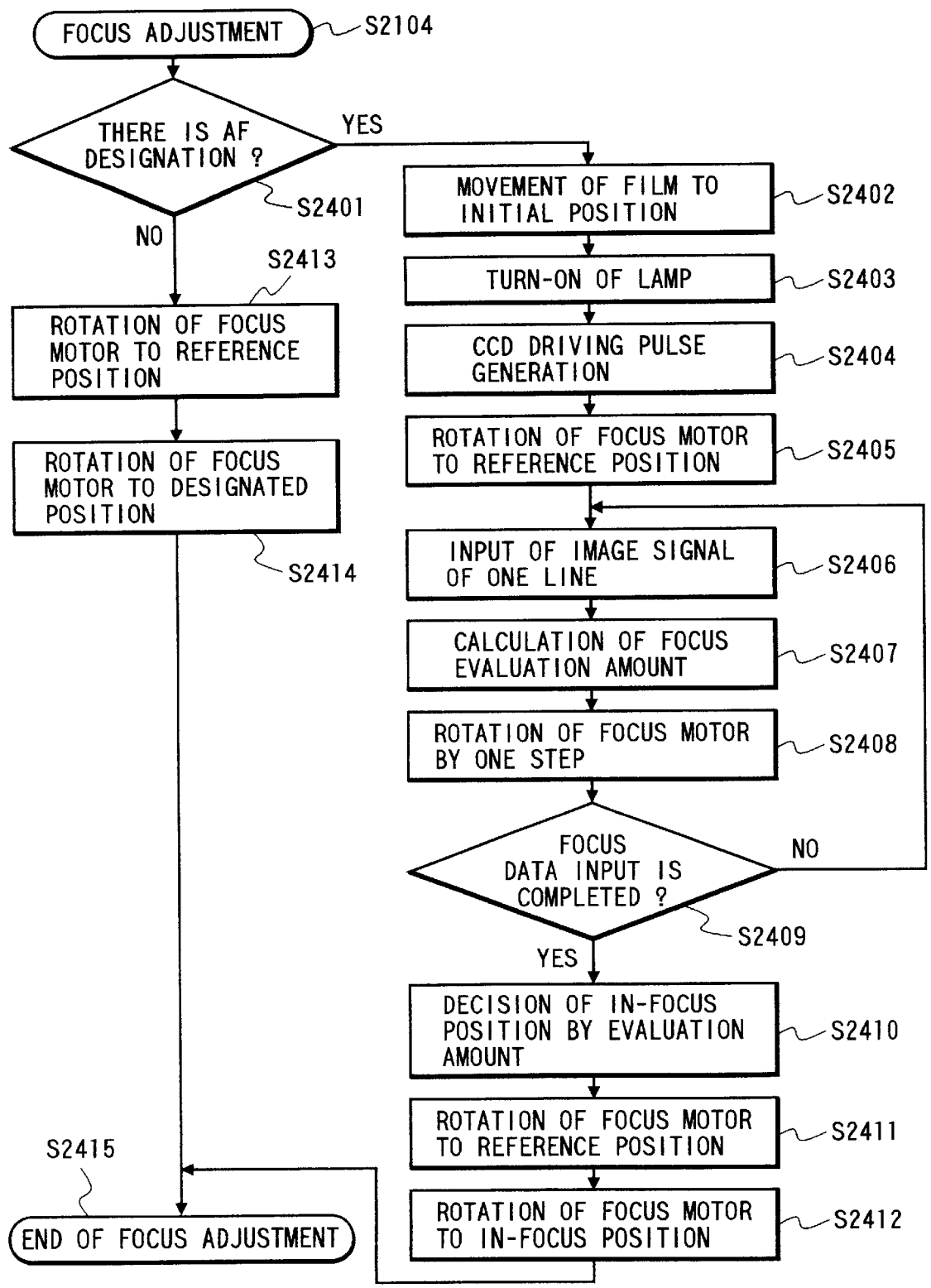
FIG. 24 is a flow chart explaining the sequence of a focus adjustment.

In the following there will be explained the operations in case the command in the command execution step S2006 in FIG. 21 is identified in the step S2103 as a focusing command, of which contents are shown in FIG. 24.

A step S2401 discriminates whether the command contains a designation for auto focusing (AF), and, if it is contained, the sequence proceeds to a step S2402, but, if not, the sequence proceeds to a step S2413.

A step S2402 drives the sub scanning motor 115 so as to move the film to the focusing position.

In a step S2403, the system controller 111 sends a light source turn-on command to the light source turn-on circuit 118.

In a step S2404, the system controller 111 sends a command to the resolution/magnification conversion circuit 205 to execute the image reading with the designated optical resolution and generates the drive signal 120.

A step S2405 drives the focusing motor 123 thereby moving the focus fixing member 105 to the initial position.

A step S2406 enters the image signal of a line and temporarily stores it in the offset RAM 122.

A step S2407 calculates the sharpness for evaluating the focus state and stores the calculated value together with the focus position. The sharpness is calculated by the already known method by summing the squares of the adjacent pixels.

A step S2408 moves the focus fixing member 105 by the focusing motor 123, thereby moving the focus position by a step.

A step S2409 discriminates whether all the data of the focusing area have been fetched, and, if fetched, the sequence proceeds to a step S2410, but, if not, the sequence returns to the step S2406.

A step S2410 determines a focus position showing the highest sharpness value among the calculated evaluation values, as the in-focus position.

A step S2411 moves the focus fixing member 105 by the focusing motor 123 to the reference position.

A step S2412 moves the focus fixing member 105 by the focusing motor 123 to the in-focus position.

A step S2413 moves the focus fixing member 105 by the focusing motor 123 to the reference position.

A step S2414 moves the focus fixing member 105 by the focusing motor 123 to the initial set position.

A step S2415 drives the sub scanning motor 115 to move the film to the initial position of sub scanning.

[Main scanning]

Figure 25:
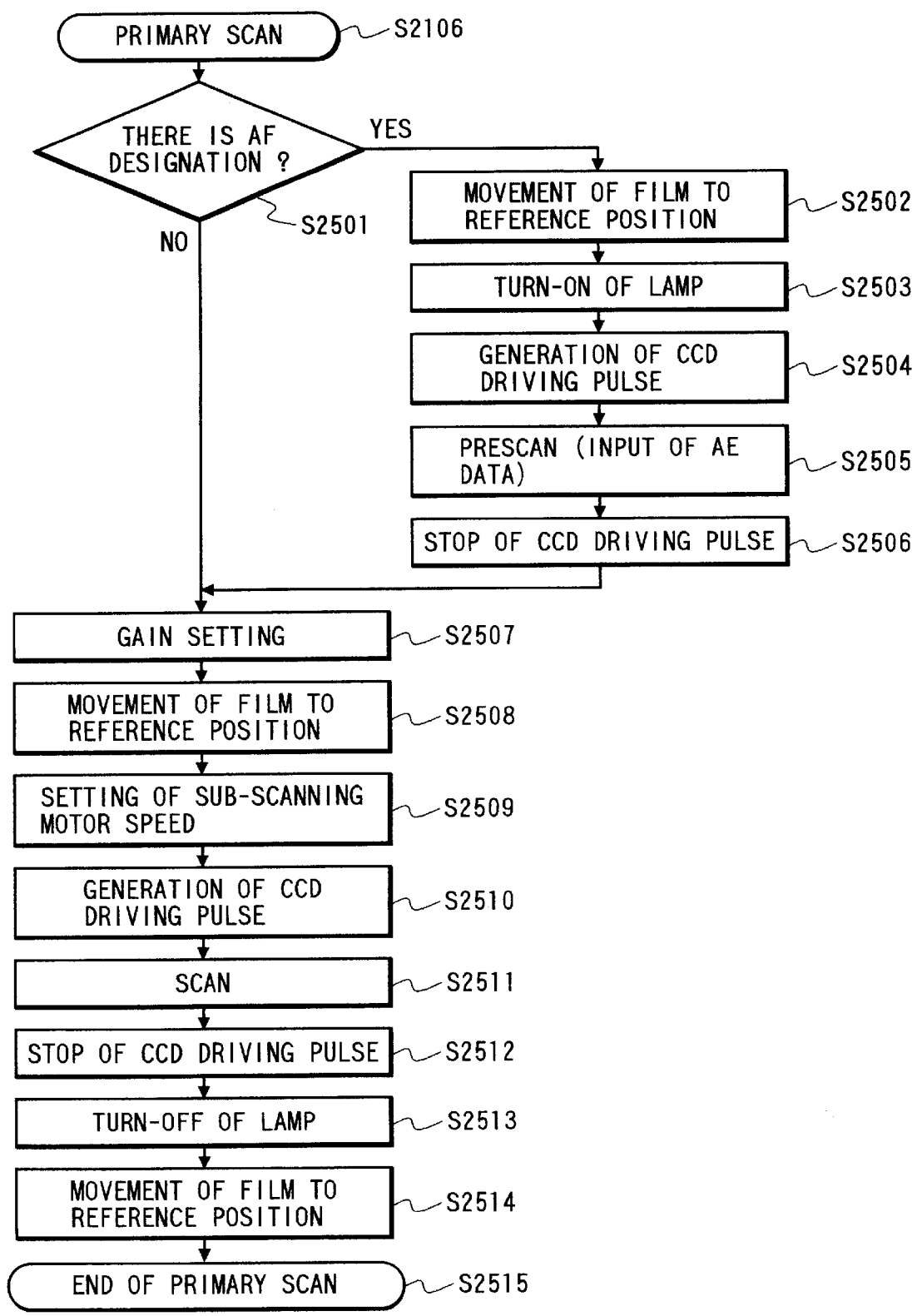
FIG. 25 is a flow chart explaining the sequence of a main scan.

In the following there will be explained the operations in case the command in the command execution step S2006 in FIG. 21 is identified in the step S2105 as a main scanning command, of which contents are shown in FIG. 25.

A step S2501 discriminates whether the command contains a designation for AE, and, if it is contained, the sequence proceeds to a step S2502, but, if not, the sequence proceeds to a step S2507.

In a step S2502 the system controller 111 drives the sub scanning motor 115 so as to move the film to the initial position of sub scanning.

In a step S2503, the system controller 111 sends a light source turn-on command to the light source turn-on circuit 118.

In a step S2504, the system controller 111 sends the drive pulse for light amount measurement to the resolution/magnification conversion circuit 205 thereby permitting the generation of the CCD drive signal 120.

A step S2505 executes the pre-scanning operation, estimates the film density from the measured light amount and calculates the gain.

A step S2506 terminates the CCD drive pulse signal 120.

A step S2507 sets the gain by the gain adjustment of the black level correction circuit 106.

In a step S2508, the system controller 111 controls the sub scanning motor 115 so as to bring the film to the initial position of the sub scanning. At the same time the system controller 111 activates an internal timer, thereby initiating the counting of time elapsing after the start of film image fetching operation.

A step S2509 sets a speed of the sub scanning motor 115 according to the resolution designated in the scan command.

A step S2510 sets the operation pulse in the main scanning direction to the resolution/magnification conversion circuit 205 according to the resolution designated in the scan command, thereby causing generation of the CCD drive pulse signal 120.

A step S2511 determines the scanning amount in the sub scanning direction and the image processing range in the main scanning direction according to the scanning range designated in the scan command, and executes the scanning operation.

A step S2512 terminates the CCD drive pulse signal 120 generated in the step S2510.

In a step S2513, the system controller 111 sends a light source turn-off command to the light source turn-on circuit 118.

A step S2514 monitors the sub scan position detecting unit 117 and drives the sub scanning motor 115 to move the film to the initial position.

Figure 22:
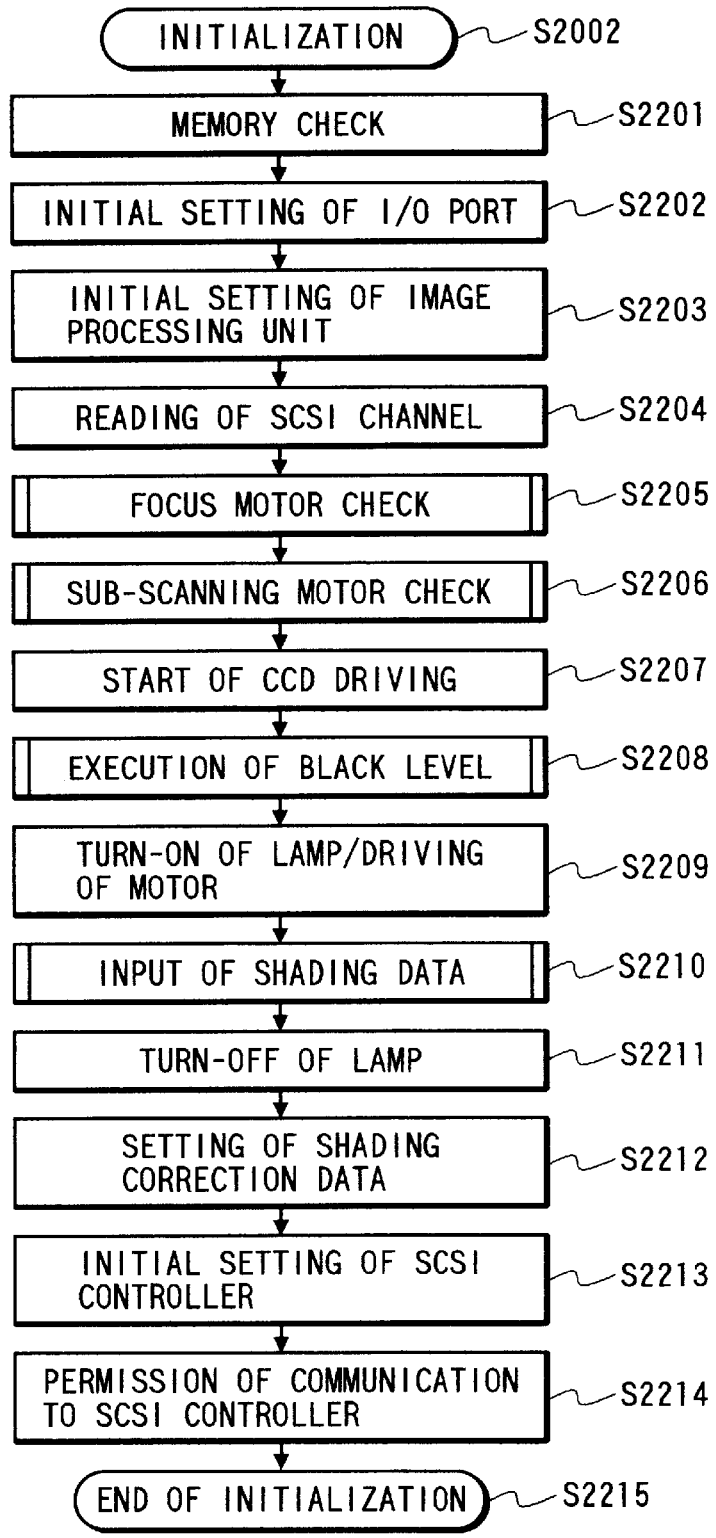
FIG. 22 is a flow chart explaining an initialization procedure.

A step S2515 terminates the present scan command sequence, after confirming the elapsed time of the internal timer of the system controller 111, activated in the step S2210 of the initialization routine shown in FIG. 22, or after confirming the elapsed time of the internal timer of the system controller 111, activated in the step S2508. Either of these times is not reset unless new shading data are fetched. If a predetermined time is exceeded, the film is retracted from the optical path of the imaging optical system, or is rewound into a magazine. Thereafter the system controller 111 provides the external equipment 114, through the interface 110, with a command for displaying a message, on the external equipment 114, requesting that the user executes the initialization again. Otherwise, after the film is rewound into the magazine, the shading data are fetched anew, then the film is drawn out to an image frame which has been set immediately before the rewinding, and the present main scan sequence is terminated.

[Ejection]

Figure 26:
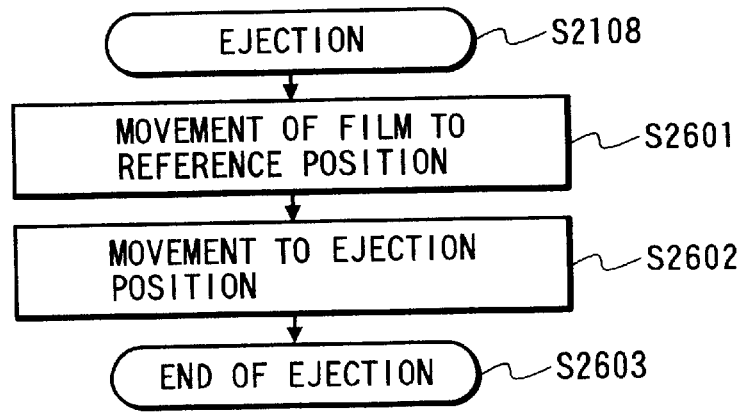
FIG. 26 is a flow chart explaining the sequence of an ejection routine.

In the following there will be explained, with reference to a flow chart in FIG. 26, the operations in case the command in FIG. 21 is an ejection command.

A step S2601 drives the sub scanning motor 115 while monitoring the sub scan position detecting unit 117, thereby moving the film to the reference position of sub scanning.

A step S2602 moves the film from the reference position to the eject position at the outside by a predetermined number of pulses.

Then a step S2603 deactivates the sub scanning motor 115 at the eject position, thereby terminating the ejection sequence.

[Film type setting]

Figure 27:
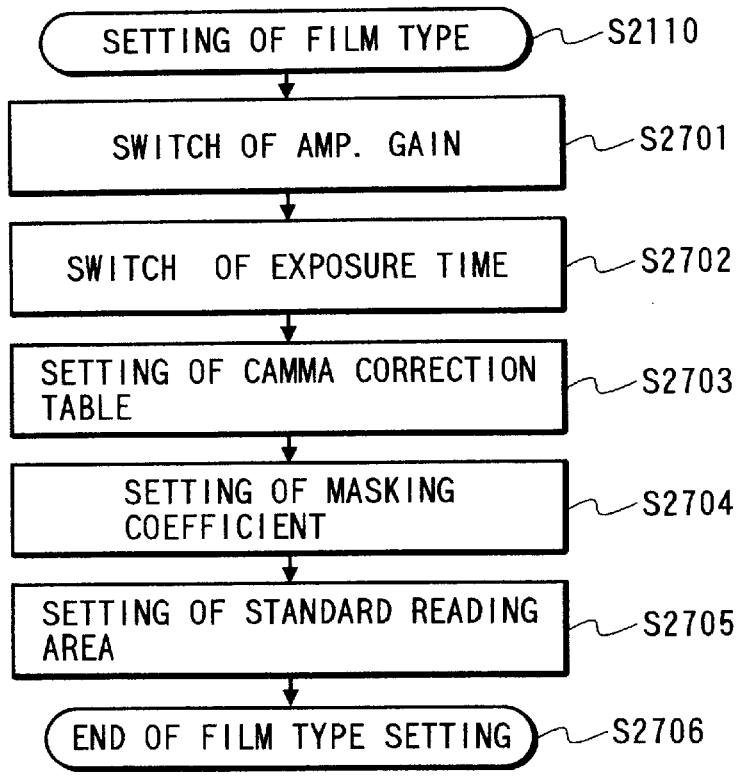
FIG. 27 is a flow chart explaining the sequence of a film type setting.
Figure 28:
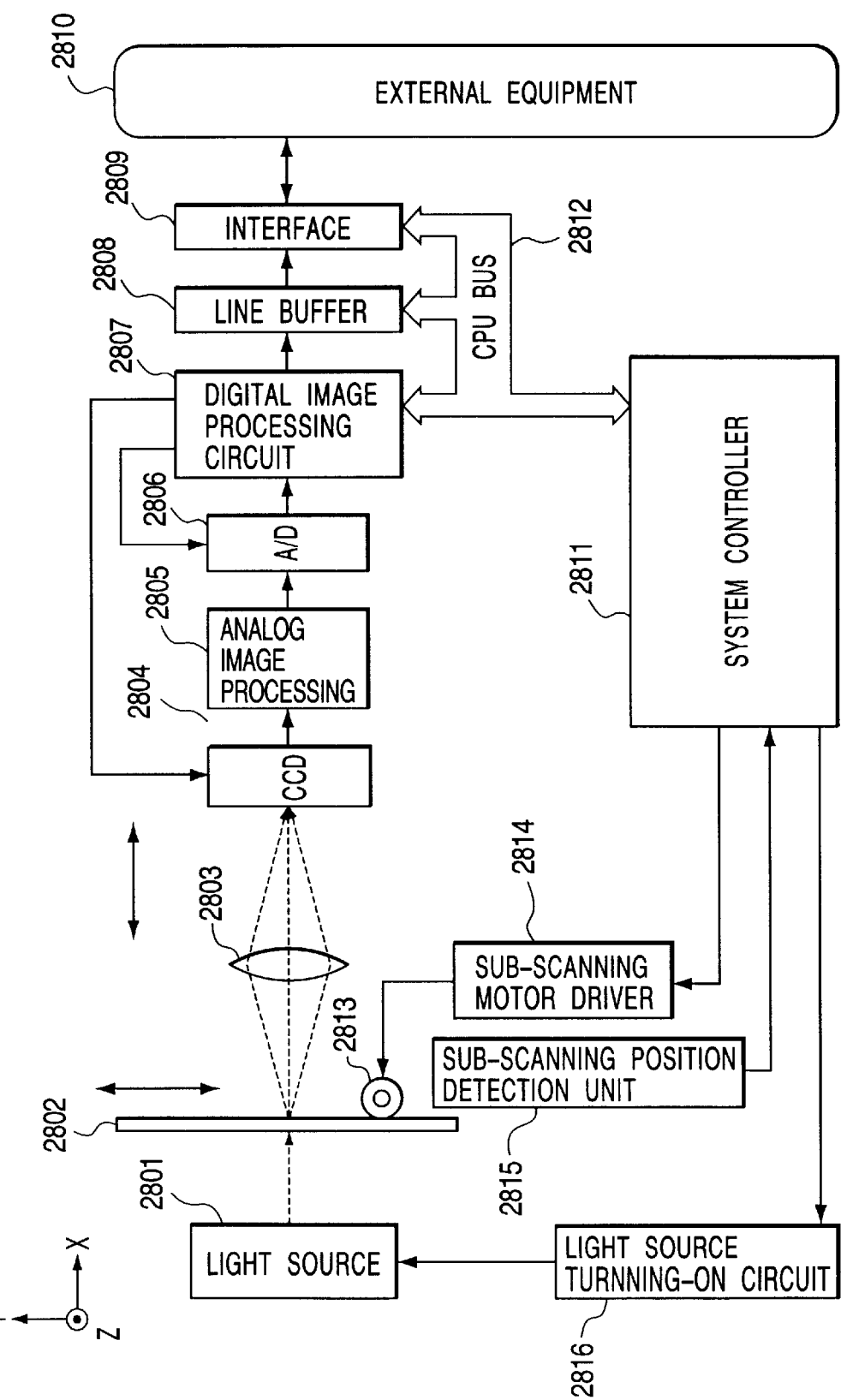
FIG. 28 is a block diagram showing an example of the configuration of the film scanner.
Figure 29:
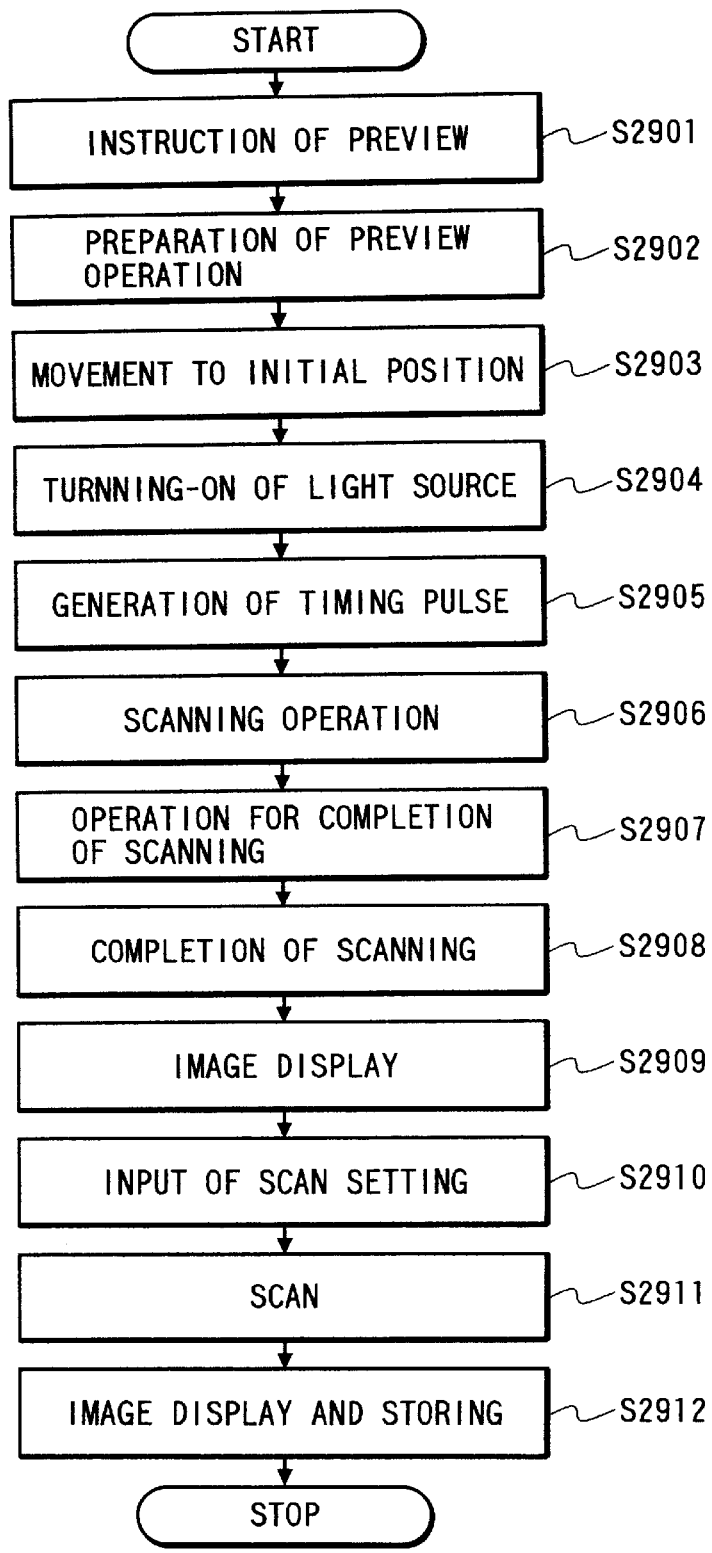
FIG. 29 is a flow chart showing an example of the operation sequence of the film scanner.

In the following there will be explained, with reference to a flow chart in FIG. 27, the operations in case the command in FIG. 21 is a film type setting command.

A step S2701 switches to a predetermined amplifier gain, according to whether the film is a negative film or a positive film, also according to one of the groups of film base density in case of the negative film, and according to whether the film is 135 film format or Advanced Photo System format.

A step S2702 switches the exposure time according to whether the film is a negative film or a positive film and also according to a high film density in case of the negative film.

A step S2703 sets a gamma correction table, appropriate to the film type designated in the step S2701, in the offset RAM 122.

A step S2704 sets masking coefficients, appropriate to the film type selected in the step S2303.

A step S2705 sets a standard reading range in case of the 135 standard film, or reads the photographing mode by the magnetic information detecting unit 119 in case of the Advanced Photo System film. In the film of the Advanced Photo System standard, one of the following three printing areas, on the film plane, is to be selected by the user at the photographing operation:

16.7×30.2 mm (1)

9.5×30.2 mm (2)

16.7×23.4 mm (3)

The image is recorded on the film with the above-mentioned size (1), and one of the three printing sizes is designated at the photographing operation. The image reading position at the scanning operation is varied according to such printing area, and the speed of sub scanning movement to the image reading position is increased to shorten the time required for the scanning operation. More specifically, in case of the size (3), the sub scanning length is shorter by 6.8 mm in comparison with the cases (1) and (2), so that the sub scanning movement can be made faster corresponding to such shorter length.

Also the film of the Advanced Photo System standard is shorter in the main scanning direction, so that there result portions not containing the image information. The signal processing may be conducted without such portions whereby the process time can be shortened and the resetting of trimming can be dispensed with.

A step S2706 terminates the present film type setting sequence.

If the command in FIG. 21 is any other command, there is executed an operation according to an application program which is set in advance for such other command.

According to the command execution explained in the foregoing, the contents of execution are informed to the external equipment 114. The external equipment 114 can control the function of the film scanner by exchanging information with the film scanner.

The information reading apparatus of the present invention has been explained as an example by a film scanner, but the present invention is not limited to the foregoing embodiment. It is likewise applicable to various image reading means and enables appropriate shading correction by detecting plural shading data, and particularly prevents errors in the detection of the shading data, resulting from the fluctuation of the power supply voltage.

More specifically, the image reading apparatus of the present invention is capable of acquiring the shading data of the light amount distribution same as that in the actual image reading operation, with respect to the fluctuation in the light amount distribution of the light source resulting from the driving of the sub scanning motor or the fluctuation in the power supply voltage according to the image reading speed, thereby constantly enabling stable and satisfactory shading correction. Also the foregoing embodiment has been explained by a case of reading an image taking film, but the present invention is not limited to such case and is applicable also to other image reading apparatuses such as a flat bed scanner, a copying machine, a facsimile apparatus or the like.

As explained in the foregoing, in an image reading apparatus in which a linear image sensor is provided in the vicinity of an imaging optical system and the main scanning operation is achieved by electronic scanning of the linear image sensor in the longitudinal direction thereof while the sub scanning operation is achieved by the relative movement of the linear image sensor and the image formed by the imaging optical system with plural scanning speed and the image information is outputted by communication between the image process means for processing the image obtained by each main scanning operation and the external equipment, there can be fetched plural shading data while a scanning motor in the sub scanning direction is driven with such plural scanning speeds, whereby precise control of the scanner or the like by the external equipment can be realized.

Also there is provided an image reading apparatus, capable of fetching shading data, indicating the light amount distribution of the light source same as that in the actual image reading operation, thereby avoiding the image quality deterioration resulting from the change in the light amount distribution of the light source, caused by the fluctuation of the power supply voltage associated with the driving of the sub scanning motor.

Furthermore, the acquisition of the shading data corresponding to the change in the scanning speed, particularly in relation to the image reading magnification and image reading resolution, allows to obtain image signal or displayed image of high quality.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a) an image sensor adapted to read an image and output an image signal;
   b) a movement unit adapted to cause a relative movement between said image sensor and the image, wherein the movement occurs at a plurality of moving speeds;
   c) a memory unit adapted to store a plurality of acquired correction data for a predetermined correction corresponding to each of the moving speeds respectively; and
   d) a correction unit adapted to effect the predetermined correction on the image signal by using the plurality of correction data corresponding respectively to the plurality of moving speeds when said image sensor reads the image.

2. An image reading apparatus according to claim 1, further comprising a light source for illuminating the image.

3. An image reading apparatus according to claim 2, further comprising a supply unit adapted to supply the movement unit and said light source with an electric power.

4. An image reading apparatus according to claim 1, wherein said image sensor is a line image sensor.

5. An image reading apparatus according to claim 1, wherein said movement unit is adapted to control the plurality of moving speeds according to the reading magnification of said image sensor.

6. An image reading apparatus according to claim 1, wherein said movement unit is adapted to control the moving speed according to the reading resolution of said image sensor.

7. An image reading apparatus according to claim 1, wherein said image is recorded on an original.

8. An image reading apparatus according to claim 7, wherein said original is a film original.

9. An image reading apparatus according to claim 8, wherein said film original includes a negative film and a positive film.

10. An image reading method comprising:
    a) a reading step of reading an image and outputting an image signal by an image sensor;
    b) a movement step of causing a relative movement between the image sensor and the image, wherein the movement occurs at a plurality of different moving speeds;
    c) a memory step of storing a plurality of acquired correction data for a predetermined correction corresponding to each of the moving speeds respectively; and
    d) a correction step of effecting the predetermined correction on the image signal by using the plurality of correction data corresponding respectively to the plurality of moving speeds when said image sensor reads the image.

11. The method of claim 10, wherein the predetermined correction is shading correction.

12. A storage medium for computer-readably storing a program for executing an image reading method, said image reading method comprising:
    a) a reading step of reading an image and outputting an image signal by an image sensor;
    b) a movement step of causing a relative movement between the image sensor and the image, wherein the movement occurs at a plurality of different moving speeds;
    c) a memory step of storing a plurality of acquired correction data for a predetermined correction corresponding to a plurality of different moving speeds respectively; and
    d) a correction step of effecting the predetermined correction on said image signal by using the plurality of correction data corresponding respectively to the plurality of moving speeds when said image sensor reads the image.

13. The medium according to claim 12, wherein the predetermined correction is shading correction.

14. The apparatus according to claim 1, wherein the predetermined correction is shading correction.

* * * * *